United States Patent
Chiles et al.

Patent Number: 6,167,567
Date of Patent: Dec. 26, 2000

[54] TECHNIQUE FOR AUTOMATICALLY UPDATING SOFTWARE STORED ON A CLIENT COMPUTER IN A NETWORKED CLIENT-SERVER ENVIRONMENT

[75] Inventors: Anthony A. Chiles, Manassas, Va.; David C. Chiles, Mitchellville, Md.; Jackie Lee Manbeck, Jr., Herndon; Vu Hoanh Nguyen, Manassas Park, both of Va.

[73] Assignee: 3Com Corporation, Santa Clara, Calif.

[21] Appl. No.: 09/073,054

[22] Filed: May 5, 1998

[51] Int. Cl.$^7$ .................................................. G06F 9/445

[52] U.S. Cl. .............................................................. 717/11

[58] Field of Search ................................ 395/712; 704/8; 707/203; 709/200, 221; 717/11

[56] References Cited

U.S. PATENT DOCUMENTS

| | | | |
|---|---|---|---|
| 5,247,683 | 9/1993 | Holmes et al. | 709/221 |
| 5,555,416 | 9/1996 | Owens et al. | 717/11 |
| 5,675,802 | 10/1997 | Allen et al. | 717/3 |
| 5,742,829 | 4/1998 | Davis et al. | 717/11 |
| 5,790,796 | 8/1998 | Sadowsky | 709/221 |
| 5,794,218 | 8/1998 | Jennings et al. | 705/35 |
| 5,835,777 | 11/1998 | Staelin | 717/11 |
| 5,835,911 | 11/1998 | Nakagawa et al. | 707/203 |
| 5,845,090 | 12/1998 | Collins et al. | 709/221 |
| 5,859,969 | 1/1999 | Oki et al. | 709/200 |
| 5,860,012 | 1/1999 | Luu | 717/11 |
| 5,903,859 | 5/1999 | Stone et al. | 704/8 |

OTHER PUBLICATIONS

"Introducing Dynamic Update", Elltech Development, Inc. downloaded from *http://www.elltechdev.com/products/dynupdt.htm* on Apr. 11, 1998 (page last dated Mar. 13, 1998), pp. 1–3.

"Tools The Rule!", Elltech Development, Inc. downloaded from *http:/www.elltechdev.com/index.html* on Apr. 11. 1998 (page last updated Apr. 10, 1998), pp. 1–4.

IBM, Using Resource Bundles to Internationalize Text Java and Mulit–language Applications, http://www.ibm.com/services/bustran/java/wpresour.html, Jun. 2000.

*Primary Examiner*—Tariq R. Hafiz
*Assistant Examiner*—Hoang-Vu Antony Nguyen-Ba
*Attorney, Agent, or Firm*—Michaelson & Wallace; Peter L. Michaelson

[57] ABSTRACT

A technique for automatically updating software, including but not limited to application programs, residing on, e.g., a client computer. Specifically, an update script is stored on a network server for each software product to be updated and, where appropriate, for each different country or locale in which that product will be installed. At a scheduled time, the client computer automatically, through an executing updating application: establishes a network connection to the server; constructs a file name for a file containing an appropriate update script; and then downloads that file from the server. The script contains appropriate update information, including whether the update is to occur through a web site or through the script, and if the latter, listings of operating system (O/S) specific and O/S-independent product update files. For a script-based update, the updating application downloads those update files, as specified by the script, corresponding to the executing O/S and then, in a sequence specified in the script, executes various files therein to complete the update. Once the update successfully concludes, the updating application appropriately updates the locally stored version number of the installed software and schedules the next update accordingly.

33 Claims, 18 Drawing Sheets

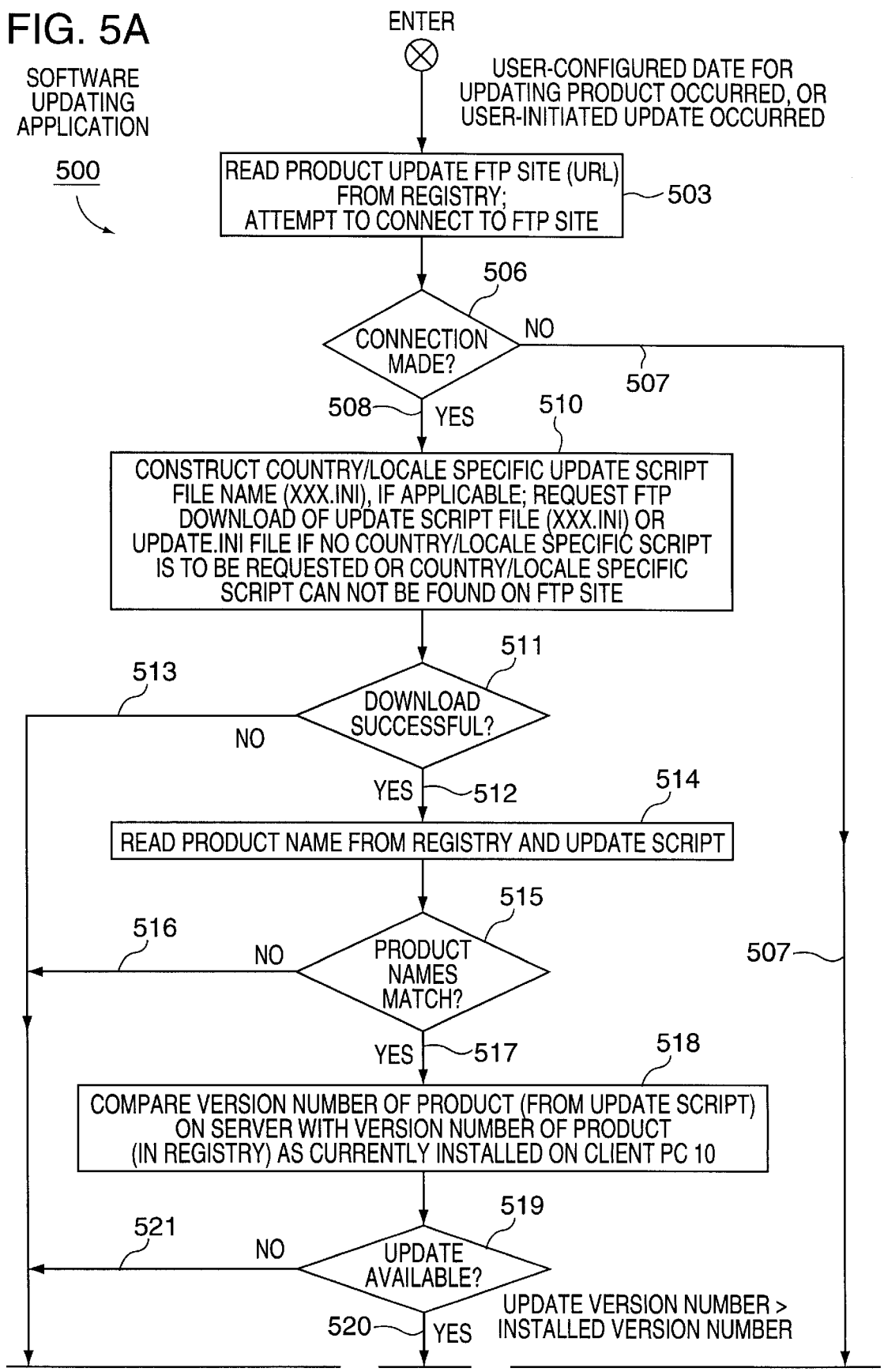

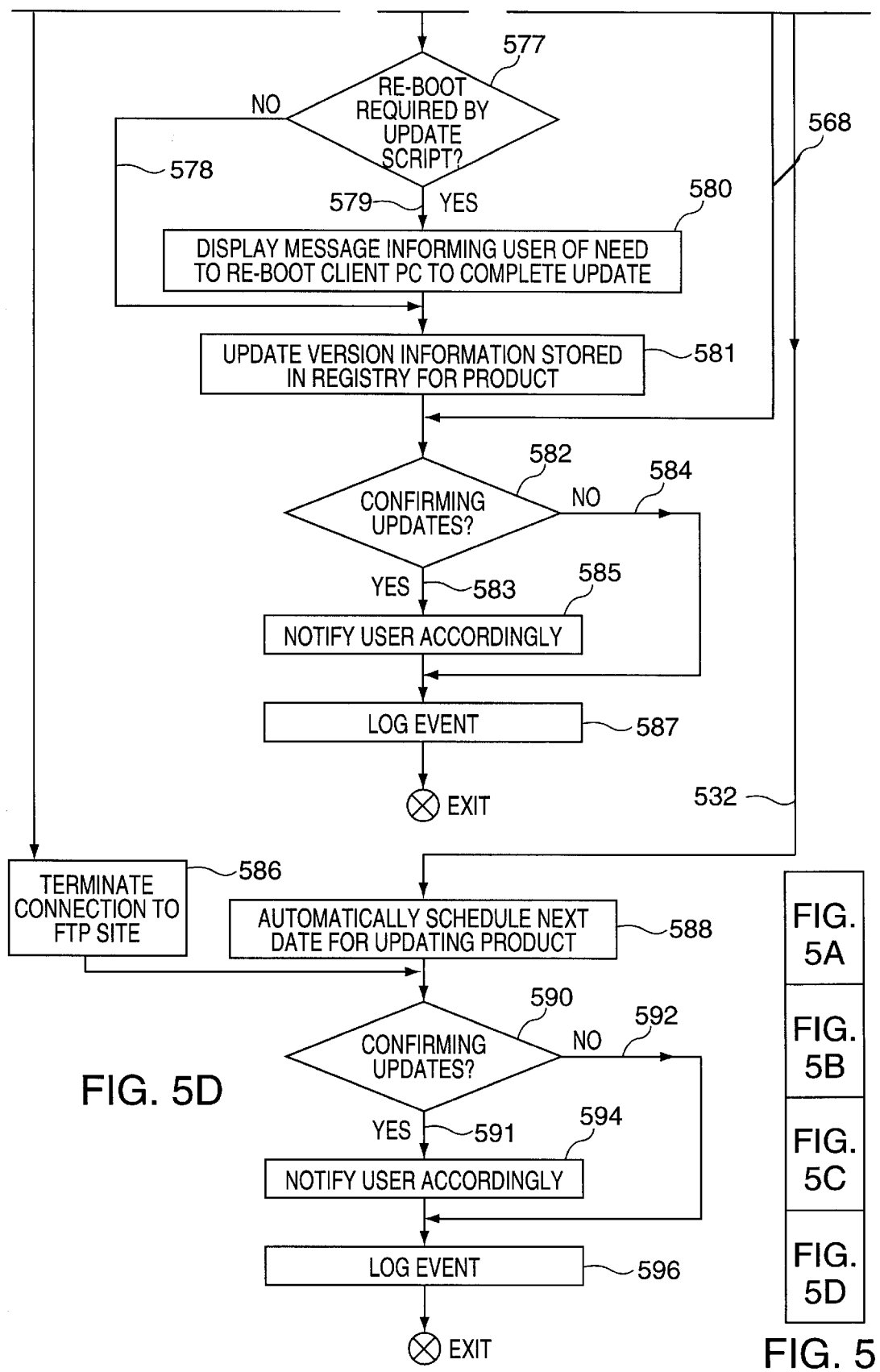

PRODUCT REGISTRATION PROCESS

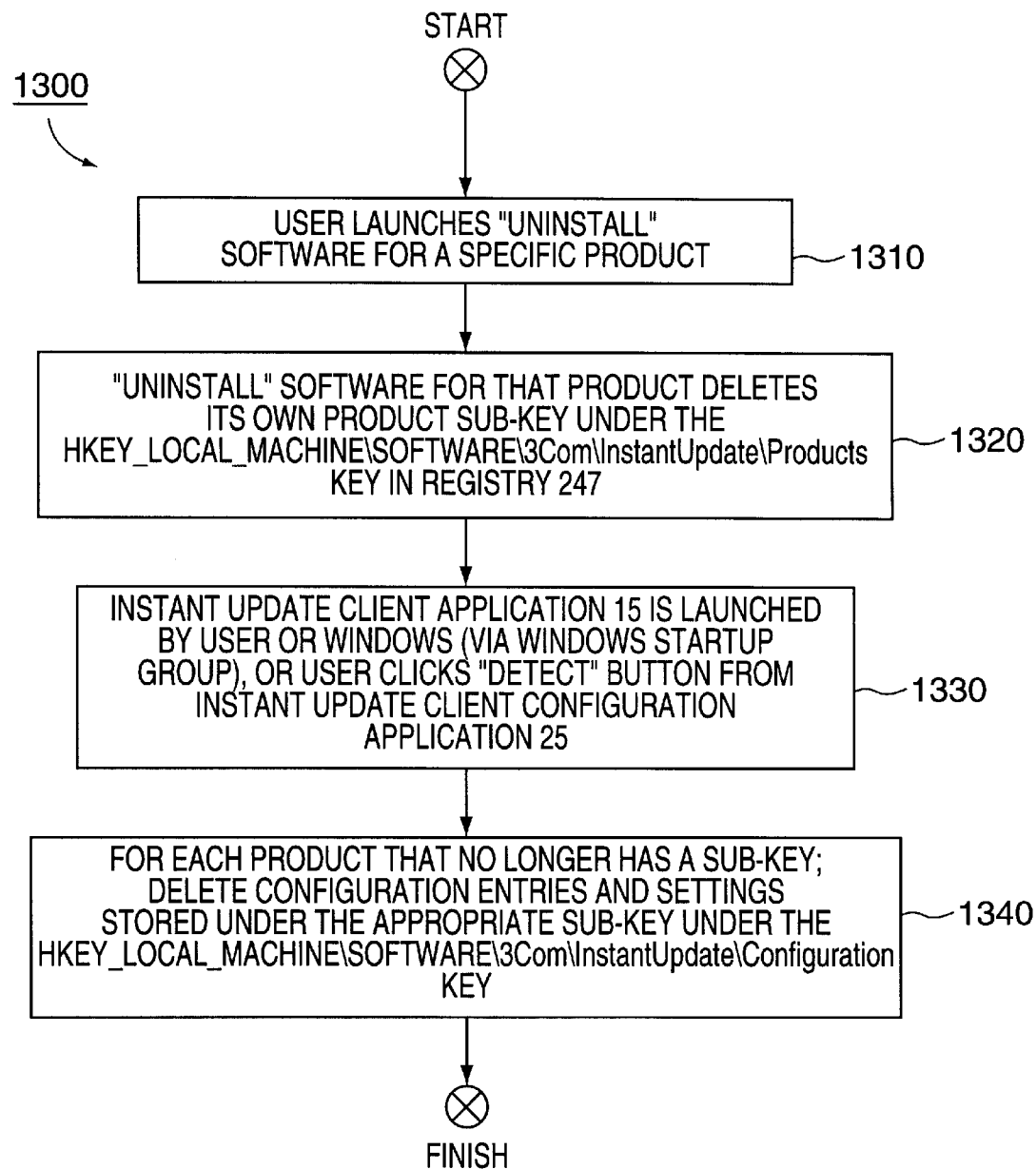

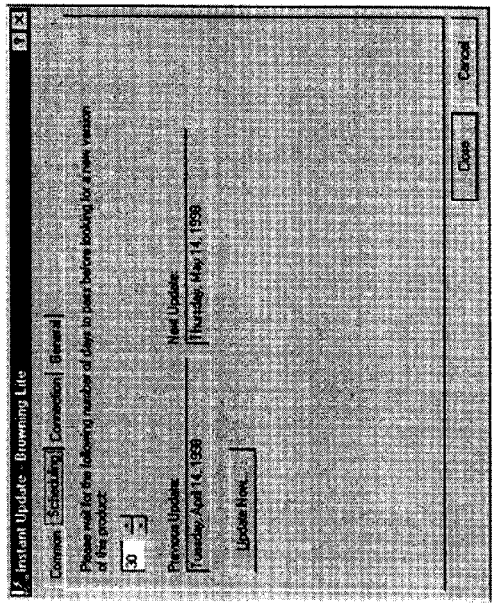
FIG. 14A — 1410
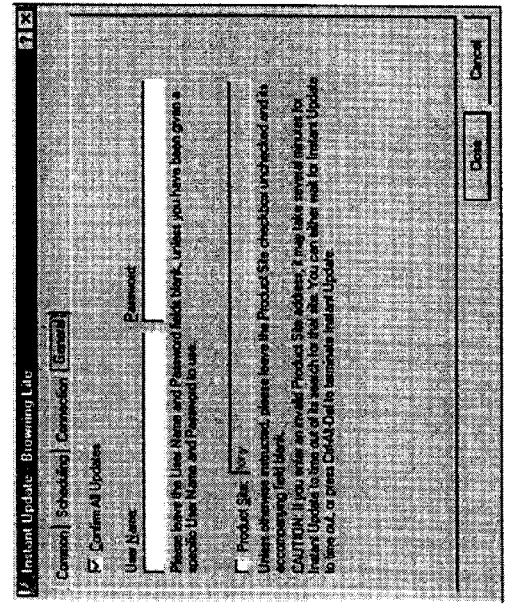
FIG. 14B — 1430
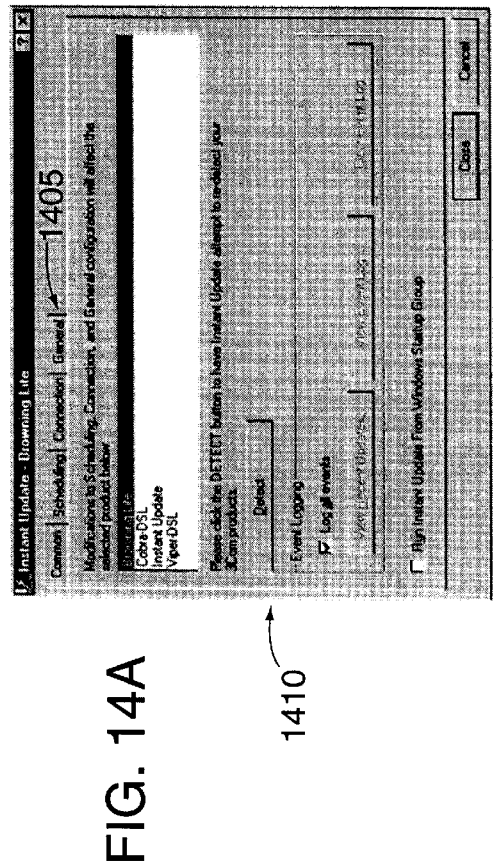
FIG. 14C — 1450
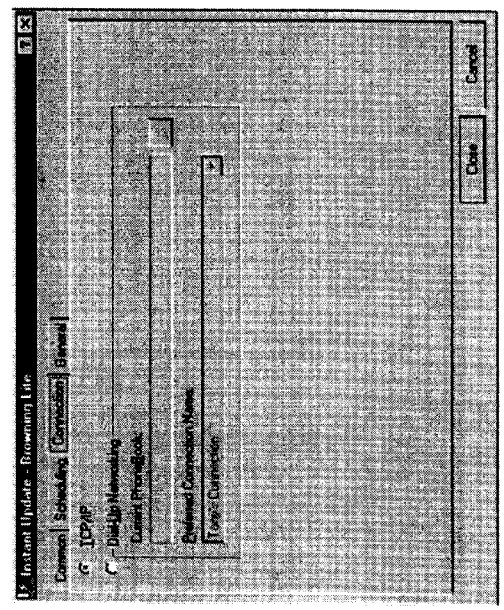
FIG. 14D — 1470

TECHNIQUE FOR AUTOMATICALLY UPDATING SOFTWARE STORED ON A CLIENT COMPUTER IN A NETWORKED CLIENT-SERVER ENVIRONMENT

BACKGROUND OF THE DISCLOSURE

1. Field of the Invention

The invention relates to a technique, specifically apparatus and accompanying methods, for automatically updating, in a networked client-server environment, software stored on, e.g., a client computer. Inasmuch as this software includes, but is not limited to application software, use of the invention can advantageously and significantly reduce costs and simplify tasks associated with maintaining and administering client software across essentially all types of different client-server environments.

2. Description of the Prior Art

Over the past decade, personal computer (PC) usage has increased substantially to the point where currently PCs (including workstations) have diffused into many aspects of a business organization. Coincident with this phenomena, a desire has increasingly arisen among computer users in a common organization to readily share computer files. This desire, particularly when fueled by historically decreasing costs of network equipment, has led to an expanding number of network installations throughout a business community to facilitate file sharing and electronic communication among not only users in a common organization, but also with users at other organizations and locations. Moreover, as these costs of increasingly sophisticated PCs and network equipment continue to fall, networked computer usage is penetrating increasingly smaller organizations as the expected benefits to those organizations, such as expanded productivity, outweigh the costs associated therewith.

If current cost and technology trends continue, PC usage should ideally proliferate throughout businesses to a point of becoming rather ubiquitous and inter-connected, i.e., at least ideally and at some time in the future where most people will possess their own PC and where such PCs will become increasingly inter-networked with each other.

However, in reality, a significant impediment to networking has been and continues to be cost—not just the initial and replacement cost of hardware, i.e., each computer and associated network equipment, and the time and effort required to successfully connect them together, but also the cost of administering, on a post-installation basis, each and every networked computer. This latter cost, which often vastly exceeds the cost of the former, includes the cost of servicing, including updating, the software stored on each and every networked computer. In a typical enterprise environment having thousands or tens of thousands of networked client PCs—which is very common today, it is very expensive for a network administrator, or, more generally speaking in a large enterprise, a member of an information technology (IT) department to physically visit each user and service his(her) client computer as required.

One conventional widely-used approach aimed at reducing the cost of maintaining software has been to post software updates on a network server and permit users to access, download and remotely install a desired update(s) from the server onto his(her) client computer. This approach is frequently used by device manufacturers, such as those manufacturing modems, video driver boards and other computer peripherals, who post their updates to their FTP or web servers which, in turn, can be remotely accessed by their customers through the Internet. The same approach is often used by software manufacturers to post "patches" and maintenance updates (so-called "service packs") for access by their user community.

This approach requires a user stationed at a client computer to access the server, via a networked connection, and then select the correct update, for a given program or firmware module, download it and finally locally install it. While, on its face, this task would appear to be rather simple, in reality, complexities exist. Software updates, for the same product, regularly vary by country and often by locales within a given country. This is particularly true for firmware updates for telecommunications devices, such as modems and other terminal adapters. Incompatibilities, in terms of, e.g., signaling used for customer premise equipment, do arise among local central offices. Consequently, different software updates are often produced by a device manufacturer in order to tailor its manufactured device to conform to the requirements of central office equipment situated in different countries and locales. Similarly, software manufacturers of traditional applications, such as word processing, spreadsheet programs and operating systems, also utilize country specific updates where necessary to adapt their product to linguistic and/or cultural aspects of a given country.

Unfortunately, a user seeking to retrieve an update for his(her) software program or device is often confronted with a bewildering array of potential updates for that particular item. Hence, the user is often unsure of the correct update to choose and frequently, as a result of this confusion, chooses the wrong update. Use of the wrong update in certain products, such as modems, owing to locale compatibility requirements, may prevent the device from operating correctly or even at all in its locale. In addition, depending on how ergonomically a web site is constructed by a manufacturer, the user may simply be uncomfortable with the site and thus reluctant to navigate through the site to locate the update (s)he needs and/or become frustrated with the site and thus abandon his(her) efforts short of completing the update. In either instance, the device or software program will not be updated.

The art, sensing the difficulties users encounter in updating their client software, is starting to provide products with an automatic software update capability. In that regard, once a product is installed and is executing at a client computer, this capability generally involves establishing, either on user request or automatically on a time-scheduled basis, a network connection from the client computer to an FTP site for the manufacturer of that product; then, determining, typically based on version numbers of the most recent update available at that site and installed at the client, whether the client software should be updated; if the client is to be updated, downloading the update file(s) from the ftp site; and, finally, executing an appropriate installation program to install the update and change the version number of the client software.

Such an approach eliminates the need for a user to navigate an unfamiliar web site to locate the update. However, this approach, when employed by a given manufacturer, is generally limited to updating software produced by just that manufacturer and not others. Also, this approach is generally unable to differentiate among country- or locale-specific updates and select the proper update for a given user location.

Furthermore, this approach, as it currently appears in the art, is limited to just updating application programs. As noted, software, other than application programs, additionally exists in client computers. This additional software, which also needs to be periodically updated, includes end user applications and firmware embedded in various devices, including modems, and drivers for various peripherals and other hardware devices. This approach is simply unable to handle this additional software. In addition to updating this software, non-executable information and/or device configurations may need to be conveyed to or updated on a client computer.

Thus, a need exists in the art for a technique, specifically apparatus and accompanying methods, for automatically updating software installed on a client computer. This technique should be able to update software from a wide variety of sources, e.g., manufacturers, and types, i.e., not just application programs but also, e.g., device firmware. In addition, this technique should be able to select, where appropriate, a correct update for the country and/or locale at which the client computer is situated. Advantageously, use of such a technique should substantially simplify the task of maintaining client computers, particular in terms of correctly updating their client software, and appreciably reduce its attendant cost; as well as reducing a burden and associated cost which a manufacturer faces in propagating software updates throughout its user community.

SUMMARY OF THE INVENTION

The present invention overcomes the deficiencies in the art and satisfies these needs through a client-based application that automatically and properly updates substantially any client-resident software via a networked server and without substantially any user intervention, but also, where necessary, to account for regional or local update differences.

Essentially and broadly speaking, to permit a community of client computers to automatically update installed software products, our inventive technique relies on storing an associated update script, on a network server, for each such product and, where appropriate, for each different country in which that product will be used. A client computer seeking to update any such product, such as at a scheduled time or through manual user initiation, will, through our inventive client updating application, construct the name of the file for the appropriate update script and then download that file, via a network connection, from the server and process it to perform the update.

In accordance with our inventive teachings, the script contains appropriate update information, including whether the update is to occur through a web site or through the script, and if the latter, listings, for the product, of operating system (O/S) specific update files (for various different operating systems which the product supports) and, where appropriate, O/S-independent update files. If the update is to occur through the script, then the client updating application downloads, from the server, those update files, as specified by the script, corresponding to its own executing O/S and, in a sequence specified in the script, executes various files therein to complete the update. If the update for the product is to occur through a web site, a web browser, residing at the client computer, is launched by the client updating application and a URL of that site is passed to the browser. The user then interacts, through the browser, with the web site to update the product. Once the script- or web-based update successfully concludes, the client updating application appropriately updates the locally stored version number of the installed software and schedules the next update accordingly.

In particular, our inventive updating technique is formed of a client updating application, resident on a client computer, and predefined TCP servers, specifically FTP and HTTP servers, and accompanying update files and scripts collectively resident on one or more network servers. The client updating application is formed of a software updating application and a configuration application.

Each item of, e.g., client-resident software (i.e., a "product"), that seeks to utilize our inventive updating technique, registers itself during, e.g., its installation on the client PC, and establishes, during its registration process, appropriate sub-key entries in an O/S registry at the client PC. One of these entries is a network URL (uniform resource locator) of an FTP site at which an update script for that particular item of software resides.

To the extent regional or local update differences exist which necessitate different update files and/or procedures, a different script resides on the server for each different country or locale. In addition or if no such differences exist, then a default server-based update script exists. Each script contains a version number to which a corresponding product will be updated; an indication as to whether the update should proceed using the update script or through a web site; and, for a script-based update, a list of all update files specific to each different operating system which the product supports. These lists contain so-called "copy" files which are merely copied to the client, and "run" files which are copied and then executed, in sequence, at the client PC. These files, when appropriately installed at the client PC, effectuate an update specific to a given country or locale, or, in the case of the default update script, a generic update.

At a user-scheduled update time, the client updating application establishes a network connection to the FTP site. Then, the software updating application constructs an appropriate predetermined corresponding file name for that script and particularly for such a script that is specific to the country or locale at which the client PC is located. The updating application then issues a request to the FTP site to access and download that particular script to the client PC. If this script exists, then it is downloaded; otherwise, the software updating application then requests the default update script.

Once the update script is downloaded, the software updating application determines, based on the version number of the update and that of the client-resident software then being updated, whether the update represents a later version of the software or not. If not, no update is performed. If it is a later version, then the software updating application examines a remainder of the update script. The script also specifies whether the remainder of the update is to governed by the script or is to proceed through a web site. If the latter is to occur, then the software updating application reads the update URL from the sub-key, for this software, in the registry and passes the URL to a web browser resident at the client PC. The browser then establishes an HTTP connection through the network to the web site, through which the update then progresses. Alternatively, if the update is to proceed on a script-basis, then each file (e.g., "run" and, where applicable, "copy" files) specified in the script for the client O/S is successively requested and downloaded to the client PC. Once all the files are downloaded, the "run" files are executed, in the sequence downloaded, to fully install the update. Thereafter, the updating application updates the version number, for the software, stored in the registry and schedules the next update.

As a feature of our invention, not only can our inventive technique update application software residing on a client, it can also update device firmware, device drivers, O/S modules and nearly any other software that resides on the client computer itself or on substantially any computer in the network, or device accessible to the network. In this case, all that is required is that the client computer have suitable network access to the specific software that is to be updated and that the software appropriately register itself, for updating, with the client. Moreover, our technique is not limited to updating software that emanates from just one source, such as a specific product manufacturer, or just one product. In that regard, our technique presents common and rather simple programming interface requirements to which any third-party can adhere, e.g., creation of a specific product sub-key in an O/S registry and various entries therein. Multiple products, regardless of their individual sources, that satisfy these requirements, during their installation on a client computer, can be automatically updated by our technique.

As another feature, since our inventive technique copies and, where instructed, executes specific update files provided to it to perform a product update, this technique will properly function with self-extracting executable installation files or other forms of executable installation programs for a product that is to be updated.

Further, as another feature, inasmuch as each product that registers with our inventive technique provides the network address (URL) of its update site, that site is not limited to just a product manufacturer site. In that regard, the update site can be established by a network administrator, rather than the product manufacturer, such that identical updates, as desired by the administrator, can be propagated to all client computers throughout a network environment thereby reducing administrative, client software maintenance and support costs. In addition, the update site, as registered, can be manually over-ridden, for one time use, by a user to a different update site such as that which provides, e.g., a so-called "beta" release of a new version of the product which the user desires to install.

Also, as a further feature, our inventive technique is not limited to being implemented in a client PC, but rather can be embedded in any network equipment, such as a router, that can establish a network connection to a network, e.g., FTP, server.

Moreover, our inventive updating technique is not limited to just supplying server-based executable update files to a client computer. This technique can be used to distribute non-executable server-based files as well throughout a client community, such as information files for display at a client computer or files containing profiles (e.g., device or system profiles) for installation onto a client computer. The dissemination of identical profiles permits a network administrator to identically configure each installation of a common product throughout an entire network, thereby ensuring client consistency and reducing administrative, support and maintenance costs.

In addition and as another feature, our inventive technique can periodically update itself as new versions of its own software become available.

BRIEF DESCRIPTION OF THE DRAWINGS

The teachings of the present invention can be readily understood by considering the following detailed description in conjunction with the accompanying drawings, in which:

FIG. 5 depicts the correct alignment of the drawing sheets for FIGS. 5A–5D;

FIGS. 5A–5D collectively depict a detailed flowchart of software updating application 500 that is executed by client PC 10, shown in FIG. 1, for performing a software update in accordance with our present invention;

FIG. 13 depicts a high-level flowchart of Product De-registration process 1300, which is performed by client PC 10, to completely uninstall a product, including its update information, from the client PC; and FIGS. 14A–14D collectively depict four different screen displays produced by configuration application 25, shown in FIG. 1, through which a user can properly configure operation of software updating application 500.

To facilitate understanding, identical reference numerals have been used, where possible, to designate identical elements that are common to various figures.

DETAILED DESCRIPTION

After considering the following description, those skilled in the art will clearly realize that the teachings of the present invention can be readily utilized in updating substantially any type of software executing in a client computer, regardless of whether that software is, e.g., an application program, operating system module, a driver, device firmware, or device configuration or, for that matter, resides in any network-connected device to which a client computer has access to the software. Hence, for purposes of this application, we define the term "client software", rather broadly, and as it pertains to software capable of being updated by our present invention, to include any and all such software, regardless of its specific function, for which an update will become available. Moreover, our present invention can be used in a wide variety of client-server network configurations, regardless of whether the network is an Internet, the Internet or otherwise; in a client computer and with a wide variety of different client operating systems; or even within a wide variety of network equipment other than a client computer, such as a router, capable of establishing a network connection to a server. Nevertheless, to simplify the ensuing description, we will primarily discuss our present invention in the illustrative context of use with remotely updating firmware for a terminal adapter that is connected to a client personal computer (PC) executing either Microsoft Windows 95, Windows 98 or Microsoft NT 4.0 or 5.0 operating system ("Windows 95", "Windows 98" and "Windows NT" are both registered trademarks of Microsoft Corporation of Redmond, Washington).

1. Client-server Update Environment

Figure 1:
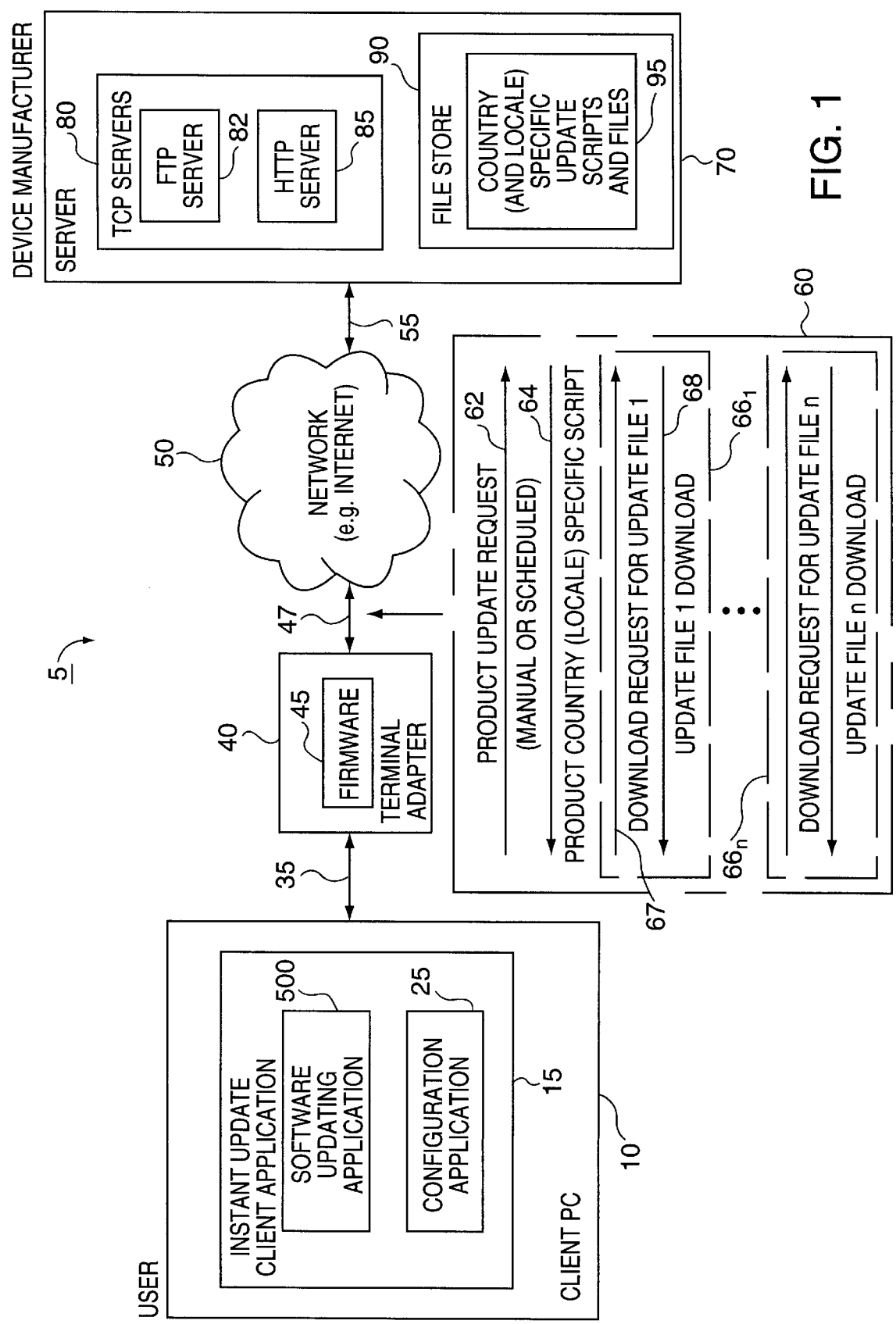
FIG. 1 depicts a high-level simplified block diagram of client-server environment 5 in which illustratively client firmware is to be automatically updated by client PC 10, from server 70, in accordance with our inventive teachings.

FIG. 1 depicts a high-level simplified block diagram of client-server environment 5 in which illustratively client firmware is to be automatically updated by client personal computer (PC) 10, from server 70, in accordance with our inventive teachings. As shown, environment 5 is formed of client PC 10 which through terminal adapter 40 and leads 35 and 47, establishes a network connection, via network 50 (which can be the Internet, intranet or any other network) and leads 55, to server 70. Inasmuch as the particular implementation and architecture of network 50 and the specific communication modality supported by the terminal adapter (such as whether it is an ISDN device, analog modem or other mode of communication) for transport over the network are both irrelevant to the present invention, the ensuing discussion will omit all such details. Suffice it to say, terminal adapter 40 bi-directionally interfaces client PC 10 to network 50. This adapter also contains firmware 45 for which its manufacturer issues software updates from time to time. These updates may include, e.g., patches and other revisions, or constitute a new software release that provides enhanced functionality. Though device 40 is illustratively shown and described as an external terminal adapter, this device can alternatively be a router, hub, or generally any externally-connected product, or any circuit board connected internally to the client PC, or located anywhere across a network to which client PC 10 has access, that contains or has associated with it software for which an update will become available.

Server 70, to the extent relevant, is typically and illustratively maintained by a manufacturer of terminal adapter 40 and implements conventional TCP (transmission control protocol) servers 80, specifically FTP (file transfer protocol) server 82 and HTTP (hypertext transfer protocol) server 85, and file store 90.

Thusfar described, to permit conventional network-based updating of firmware 45 for terminal adapter 40, the manufacturer will place requisite update files either on its FTP site and/or its web site and permit its customers to access, through their client PCs, either site and download the necessary files. To do so, a user stationed at client PC 10 will typically establish either an FTP connection through network 50 to server 70, specifically to FTP server 82, or an HTTP connection to HTTP server 85. Having done so, the user will then navigate through the FTP site or web site to locate and download the proper update files. Thereafter, these files will then install the update either off-line, through user initiated-execution of typically an appropriate "setup" (setup.exe) file, or through automatic initiation through the web site. Once the update has completed, the client PC will then terminate the FTP or HTTP connection to server 70.

Unfortunately, this conventional approach is directed to just application programs and not other client-resident software, such as firmware and drivers, that require updating and is often product-specific (i.e., functional with just one product). Moreover, this approach does not accommodate updates that are country and/or locale specific to account for differences in regional or locale compatibility, linguistics and/or customs.

In contrast, our present invention not only permits substantially any client-resident software to be automatically and properly updated, through a networked server and without substantially any user intervention, but also, where necessary, to account for regional or locale update differences. Our present invention can readily function with any IP (Internet Protocol) network, regardless of whether a network connection is made through a dedicated local area network or dial-up connection.

Essentially, to permit a community of client computers to automatically update installed software products, our inventive technique relies on storing an associated update script, on a network server, for each such product and, where appropriate, for each different country in which that product will be installed. A client computer, such as client computer 10, seeking to update any such product, such as at a scheduled time, will automatically, through our inventive client updating application: (a) establish a network connection to the server, (b) construct the name of the file for the appropriate update script and then (c) download that file from the server. The script contains appropriate update information, including whether the update is to occur through a web site or through the script, and if the latter, listings, for the product, of operating system (O/S) specific update files (for various different operating systems which the product supports) and, where appropriate, of O/S-independent update files. If the update is to occur through the script, then the client updating application downloads, from the server, those update files, as specified by the script, corresponding to its own executing O/S and, in a sequence specified in the script, executes various files therein to complete the update. If the update for the product is to occur through a web site, a web browser, residing at the client computer, is launched by the client updating application and a URL of that site is passed to the browser. The user then interacts, through the browser, with the web site to update the product. Once the script- or web-based update successfully concludes, the client updating application appropriately updates the locally stored version number of the installed software and schedules the next update accordingly.

In particular, our inventive updating technique is formed of a client update application, specifically application 15, resident on a client computer, and predefined TCP servers 80 and accompanying update files and scripts 95 collectively resident on one or more network servers, here the files and scripts illustratively residing within file store 90 on server 70. The client update application (captioned "Instant Update Client Application" in the figures) is itself formed of software updating application 500 (also referred to herein as "updating application 500" or simply "application 500") and configuration application 25. The TCP servers consist of FTP server 82 and HTTP server 85. Illustrative client-server messaging is depicted in block 60.

Each item of, e.g., client-resident software (also referred to hereinafter as a "product"), that seeks to utilize our inventive updating technique, registers itself during, e.g., its installation on the client PC, and establishes, during its registration process, appropriate sub-key entries (as discussed in detail below) in an O/S registry at the client PC. One of these entries is a network URL (uniform resource locator) of an FTP site at which an update script for that particular item of software resides.

To the extent regional or locale update differences exist which necessitate different update files and/or procedures, a different script resides on the server for each different country or locale. In addition or if no such differences exist, then a default server-based update script exists. Each script contains a version number to which a corresponding product will be updated; an indication as to whether the update should proceed using the update script or through a web site; and, for a script-based update, a list of all update files specific to each different operating system which the product supports. These lists contain so-called "copy" files which are merely copied to the client, and "run" files which are copied and then executed, in sequence, at the client PC. These files, when appropriately installed at the client PC, effectuate an update specific to a given country or locale, or, in the case of the default update script, a generic update.

At a user-scheduled update time, software updating application 500 establishes a network connection to the FTP site. Then, application 500 constructs an appropriate predetermined corresponding file name for that script and particularly for such a script that is specific to the country or locale at which the client PC is located. Updating application 500 then issues a request, as symbolized by line 62, to the FTP site, e.g., FTP server 82, to access and download that particular script to the client PC. If this script exists, then, as symbolized by line 64, it is downloaded; otherwise, updating application 500 then requests the default update script (not specifically shown).

Once the update script is downloaded, updating application 500 reads product name information from the script to ensure that update information on the server corresponds to the product then being updated. Thereafter, application 500 determines, based on the version number of the update and that of the client-resident software then being updated, whether the update represents a later version of the software or not. If not, no update is performed. If it is a later version, then application 500 examines a remainder of the update script. The script also specifies whether the remainder of the update is to governed by the script or is to proceed through a web site. If the latter is to occur, then application 500 reads the update URL from the sub-key, for this software, in the registry and passes the URL to a web browser resident at the client PC. The browser then establishes an HTTP connection through network 50 to server 80 and specifically HTTP server 85 thereon, through which the update then progresses. Alternatively, if the update is to proceed on a script-basis, then, as symbolized by blocks $66_1$ through $66_n$, each file ("copy" and/or "run" files, as applicable) specified in the script for the client O/S is successively requested, as symbolized by, e.g., line 67 for file 1, and downloaded, as symbolized by, e.g., line 68 for file 1, to the client PC. Once all the files are downloaded, the "run" files are executed, in the sequence downloaded, to fully install the update. Thereafter, application 500 updates the version number, for the software, stored in the registry and schedules the next update. The messages depicted in block 60 can occur, at a different scheduled time, for each different item of software being updated. In addition, application 500 can also undertake an update for any item of software, that has established suitable registry entries, in response to a manual request from the user.

Now, with specific reference to the software updating example shown in FIG. 1, while software for terminal adapter 40 is installed into client PC 10, that software will establish suitable entries in the registry for updating terminal adapter firmware 45. At an appropriate time (or in response to user-initiation, if desired), updating application 500 will update this firmware, by downloading the specific update script and files as discussed above. Once all the update files have been suitably downloaded to client PC 10, the client PC, under control of application 500, will execute downloaded "run" files so as to generate and flash suitable updated firmware, as firmware 45, into terminal adapter 40. Thereafter, application 500 will change the version number of the firmware, for terminal adapter 40, stored in the registry and schedule the next automatic update for this particular firmware.

Through use of our invention, update files and scripts can be placed on nearly any FTP server or web server, not just that maintained by the manufacturer of the software being updated. Hence, to readily ensure consistency across all client software installations on a network, such as an enterprise-wide network and thus significantly reduce client PC maintenance costs, network administrators can maintain the update site on an appropriate intranet file server(s) and use that server(s) to supply update scripts and files for all clients in the network. In this case, the software installation process would be suitably altered to write the URL of that server (rather than the server of the manufacturer of the software) into an appropriate sub-key, for this software, in the registry of each client O/S.

Advantageously, our invention provides a common network-based updating methodology that can be utilized for client software written in a wide variety of different languages and which can be used in lieu of configuration application 25, thereby simplifying the overall task of software updating and markedly reducing its cost, for a manufacturer, a network administrator and a user.

2. Client PC

Figure 2:
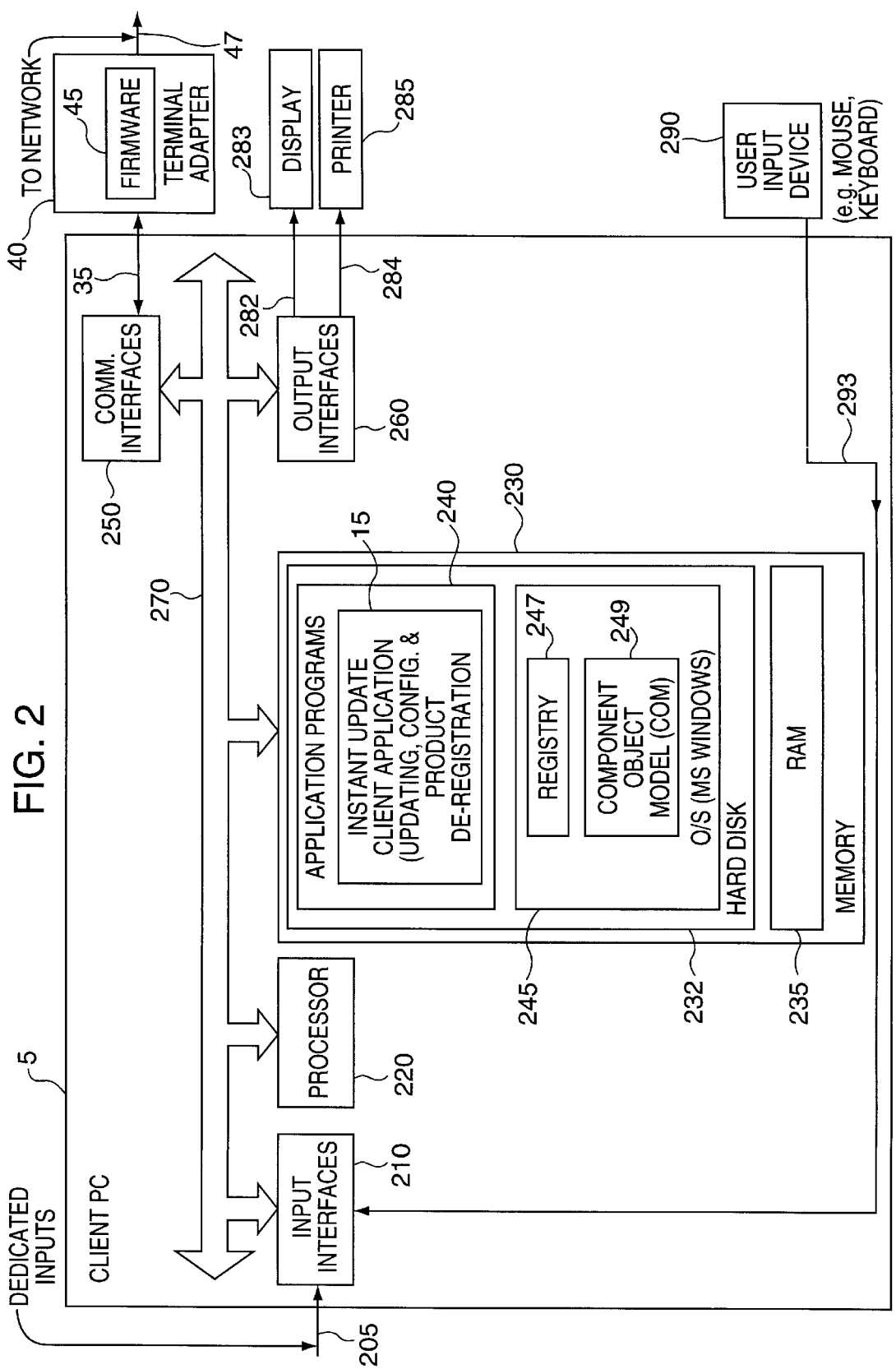
FIG. 2 depicts a high-level block diagram of client PC 10 shown in FIG. 1.

FIG. 2 depicts a high-level block diagram of client PC 10.

As shown, client PC 10 comprises input interfaces (I/F) 210, processor 220, memory 230, communication interfaces 250, and output interfaces 260, all conventionally interconnected by bus 270. Memory 230, which generally includes different modalities, includes illustratively random access memory (RAM) 235 for temporary data and instruction store, diskette drive(s) (not specifically shown) for exchanging information, as per user command, with floppy diskettes, and a non-volatile store typically implemented by hard disk drive(s) 232 which are generally magnetic in nature. Terminal adapter 40 is connected through leads 35 to communication interfaces 250, e.g., implementing an RS-232 serial port, and specifically contains firmware 45 that is to be updated.

Incoming information can arise from two illustrative external sources: network supplied information, such as through network connection 47 to the terminal adapter, or other information from a dedicated input source—should it be connected, via path 205, to input interfaces 210. Since such a dedicated input source is not relevant here, it will not be discussed in any further detail. Suffice it to say that input interfaces 210 contain appropriate circuitry to provide necessary and corresponding electrical connections required to physically connect and interface each differing dedicated input source to client PC 10.

Input interfaces 210 also electrically connect and interface user input device 290, such as a keyboard and mouse, to client PC 10. Display 283, such as a conventional color monitor, and printer 285, such as a conventional laser printer, are connected, via leads 282 and 284, respectively, to output interfaces 260. The output interfaces provide requisite circuitry to electrically connect and interface the display and printer to the client PC.

Memory 230, specifically hard disk 232, stores application programs 240, including our inventive client update application 15, and operating system 245. Application 15 includes the software updating application (application 500 discussed in detail below in conjunction with FIGS. 5A–5D), the configuration process and appropriate software modules to perform a product de-registration process (process 1300 discussed in detail below in conjunction with FIG. 13). Operating system 245, which is illustratively the Microsoft Windows 95, Windows 98 or Microsoft Windows NT 4.0 or 5.0 operating system, includes registry 247 and component object model (COM) 249. Inasmuch as the registry and COM are well-known in the art, we will only discuss below those aspects of these software modules that are specifically germane to the present invention.

Furthermore, since the specific hardware components of client PC 10 as well as all aspects of the software stored within memory 230, apart from the modules that specifically implement the present invention, are also conventional and well-known, they will not be discussed in any further detail. Generally speaking, the network server, such as server 70 (shown in FIG. 1), has a hardware architecture that, at a high-level, is quite similar to that of client PC 10.

3. Architectural Aspects of Present Invention

Figure 3:
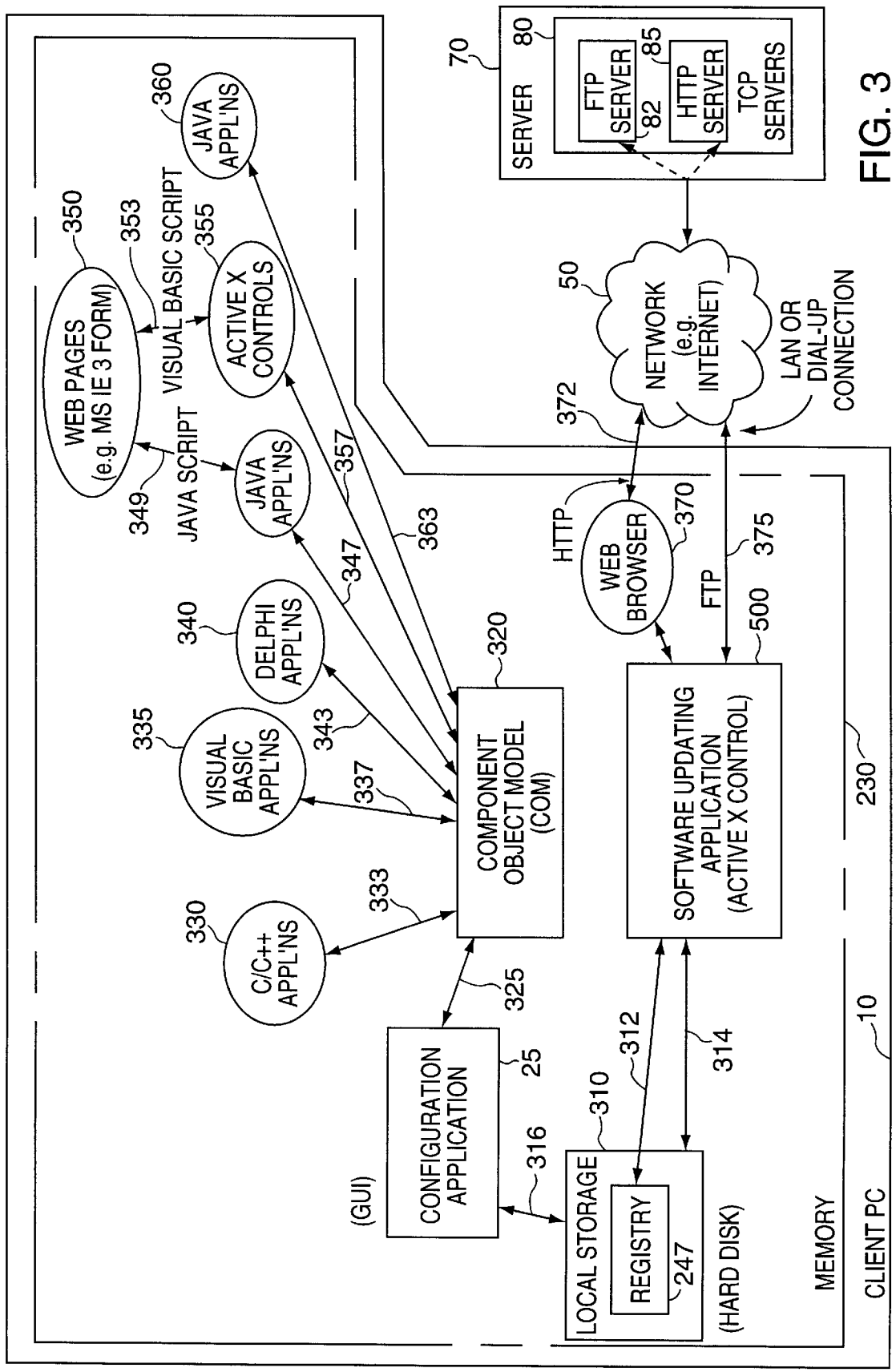
FIG. 3 depicts a high-level architectural block diagram of software that implements our present invention within client PC 10, along with its attendant software modules and hardware components.

FIG. 3 depicts a high-level architectural block diagram of software that implements our present invention within client PC 10, along with its attendant software modules and hardware components that are collectively used to perform a network update.

As shown and noted above, our invention is formed of two new components: updating application 500 and configuration application 25. Application 500, which is discussed in detail below in conjunction with FIGS. 5A–5D, is implemented as an Active X control. In general and to the extent relevant, Active X is a set of software technologies that, in conjunction with a component object model (COM), enable software components to interact with one another regardless of the language in which the components are written. Application 500, as an Active X control, interacts, as shown in FIG. 3 and through COM 320, with a wide variety of software items that require updating, regardless of the language in which each such item is written. In that regard, application 500, through COM 320 and as symbolized by lines 333, 337, 343, 347, 357, and 363 can interact with and update illustratively C/C++ applications 330, Visual Basic applications 335, Delphi applications 340 (Delphi being a language developed and promulgated by Borland International now Inprise Corporation in Scotts Valley, Calif.), Java applets 345, other Active X controls 355 and Java applications 360, respectively. Java applets 345 and Active X controls 355 can themselves implement web page objects, as symbolized by lines 349 and 353, respectively written in JavaScript or Visual Basic Script, associated with web pages 350. These pages themselves may be compatible with, e.g., Microsoft Internet Explorer (MS IE) version 3.0 or later. Since the specific functionality of any of these applications and applets is irrelevant to the present invention, we will not address it.

Configuration application 25 provides a graphical user interface (GUI) through which a user stationed at client PC 10 can interact with and configure application 500. The extent of this configuration, which will become evident from the screen displays shown in FIGS. 14A–14D, includes, e.g., detecting and registering any software product for use with application 500; enabling event logging of update activity; and for each software product so registered, e.g.: scheduling update intervals for that product, specifying a network connection method and connection parameters for connecting to a network server for updating that product, and confirming all updates of that product with a user. Configuration application 25 stores and accesses, as symbolized by line 316, configuration information within local storage 310 which is collectively implemented by requisite storage space within hard disk 232 (see FIG. 2). Local store 310 includes, as shown in FIG. 3, O/S registry 247. Additionally, configuration application 25 also communicates, as symbolized by line 325 and through COM 320, with updating application 500.

Updating application 500 accesses and modifies to the extent needed, sub-key entries in registry 247 for each item of software being updated, and reads and writes data into local storage, as needed. These data flows are respectively represented by lines 312 and 314.

As discussed above, updating application 500 can perform an update either on a script-basis or through a custom web site. The former occurs via FTP connection 375 and network 50, to FTP server 82. The latter occurs using web browser 370, via HTTP connection 372 and network 50, to HTTP server 85.

4. Client-based Operations and Client-server Interaction for Updating Application 500

Figure 4A:
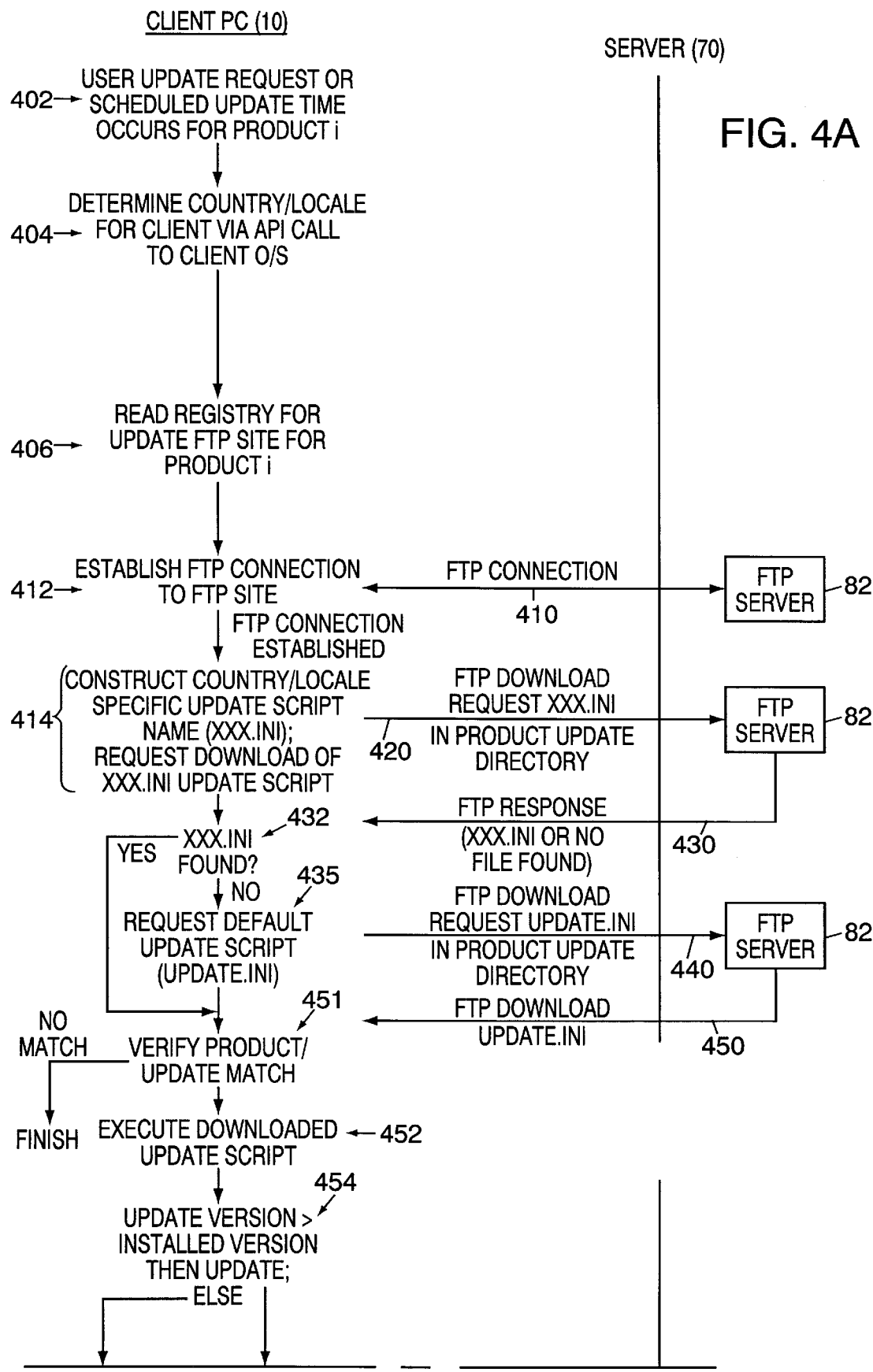
FIGS. 4A and 4B collectively depict, in a simplified high-level manner, client-based operations and client-server interaction, between, e.g., client PC 10 and server 70 shown in FIG. 1, that collectively occur through execution of software updating application 500 shown in FIGS. 1 and 3.
Figures 4, 4A, 4B:
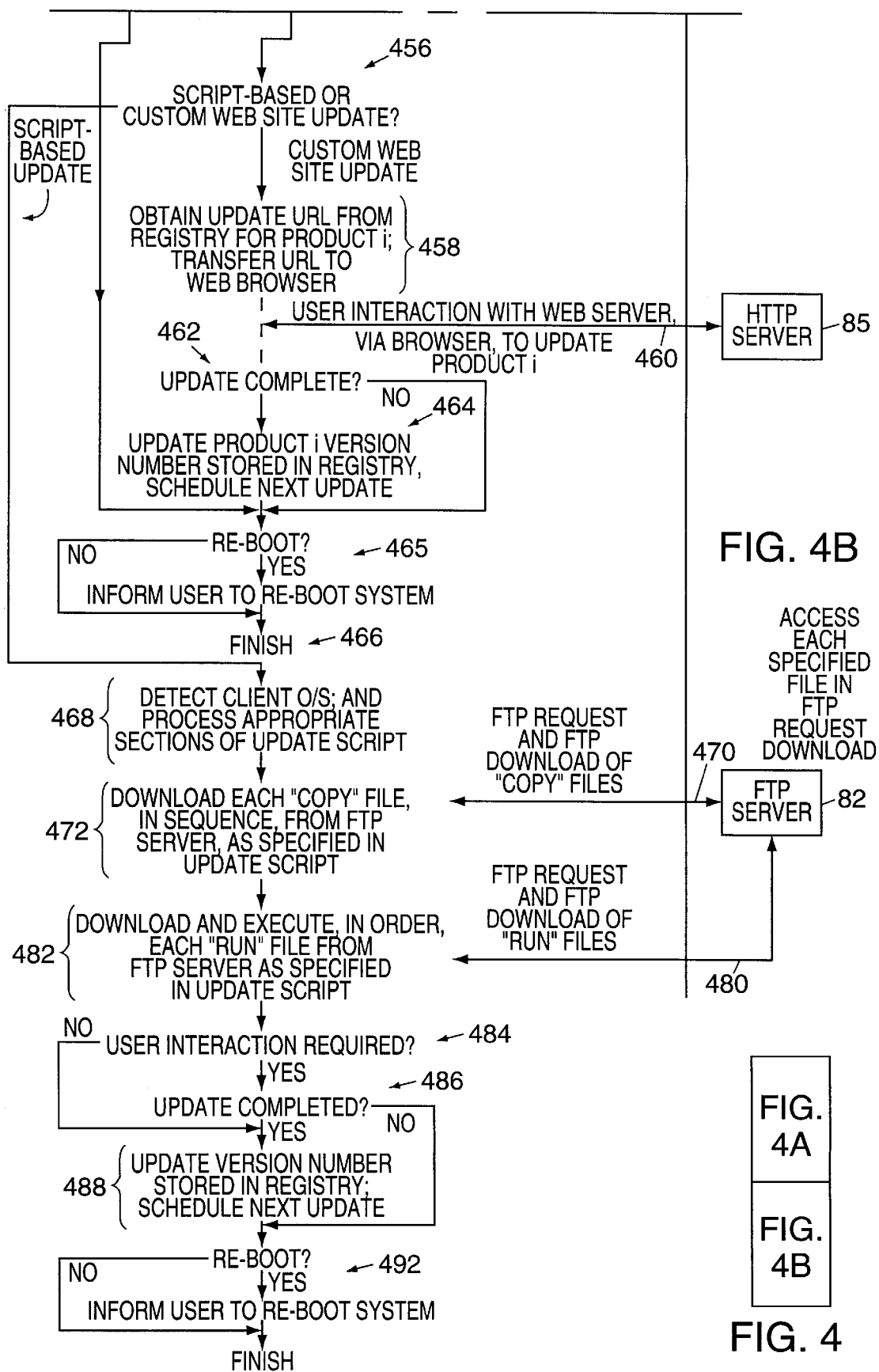
FIG. 4 depicts the correct alignment of the drawing sheets for FIGS. 4A and 4B.

FIGS. 4A and 4B collectively depict, in a simplified high-level manner, client-based operations and client-server interaction, between, e.g., client PC 10 and server 70, that occur through execution of updating application 500 to update product i (where i is an integer $0<i \leq n$ with n being a number of all products that have registered with the client PC for updating); the correct alignment of the drawing sheets for these figures is shown in FIG. 4.

First, through operations 402, either a user manually generates an update request, such as depressing an "Update Now" button on a specific configuration screen display for a desired product, specifically screen display 1430 shown in FIG. 14B, to update product i or a scheduled time occurs at which product i will be automatically updated. Next, through operations 404, application 500 executing at the client PC determines, through a conventional API (application program interface) call to client O/S 245 (see FIG. 2) to discern the country (or geographic locale) in which the client PC resides. This country was specified by the user of that PC typically during initial installation of its client O/S. Once application 500 discerns the country or locale, operations 406, as shown in FIGS. 4A and 4B, occur through which the client PC reads O/S registry 247 for a URL for an FTP site that contains the update script(s) for product i. Once this occurs, operations 412 occur to establish an FTP connection, as symbolized by line 410, to this site, specifically here to FTP server 82, and to a directory of update scripts residing at that server.

After the FTP connection is established, client PC 10 performs operations 414 to construct a country (or locale) specific file name for the desired update script for product i. For different countries, this script is named in accordance with ISO 3166 three-letter naming standard with an ".ini" suffix to form a file named "xxx.ini" where "xxx" is a three-letter country name. For different locales, the prefix is uniquely named in a predefined manner; however, the same ".ini" suffix is used. To simplify the ensuing discussion, we will only address country-specific file names. Thereafter, client PC 10 issues a request, as symbolized by line 420, to server 70 and particularly to FTP server 82 therein for an FTP download, from the script directory, of this specific file for the update script. FTP server 82 will then issue an appropriate response, as symbolized by line 430, which constitutes either the requested file or an indication that the requested file could not be found. Next, through operation 432, client PC 10, based on the specific FTP response provided by server 70, specifically FTP server 82, selects an appropriate script file. In particular, if FTP server 82 did not find the requested script file "xxx.ini", the client PC performs operations 435 to issue another FTP request, here symbolized by line 440, back to FTP server 82, for a default update script file (named "update.ini"). Since the default file will exist in the script directory on server 82, this server, as symbolized by line 450, will then download this default script file to the client PC which, in turn, will use this file as the update script. Alternatively, if the country-specific file is found, then this file is used, as the update script, in lieu of the default file.

Thereafter, once the appropriate update script has been obtained, the client PC checks, through operations 451, the product name against that in the downloaded update script (xxx.ini or update.ini) to ensure the two match such that the update is associated with the product which is then to be updated. Thereafter, the client PC, through operations 452, processes this script. In doing so, client PC 454 reads the version number of the product stored in the script and compares that version number against the version number, stored in registry 247, of the product as it is currently installed. If the version number of the update does not exceed that of the product, as it is presently installed, then application 500 closes the FTP connection, with no further updating operations, and execution of application 500, at the client PC, for product i finishes.

Alternatively, if the version number of the update exceeds that of the installed version of the product, the client PC performs operations 456 to determine, based on an entry in the update script, whether the update is to proceed either through the update script itself or through a custom web site.

If a custom web site update is to occur, then client PC 10 performs operations 458. Through these operations, the client PC obtains, from registry 247, the URL of the update web site for product i, initiates execution of client web browser 370 (see FIG. 3) and passes that URL to the browser for retrieving an "INDEX.HTM" file. The browser then establishes, as symbolized by line 460 in FIGS. 4A and 4B, an HTTP connection with the update web site, here illustratively HTTP server 85, and opens the INDEX.HTM page at this site. Thereafter, the user then interacts, through the client PC and the browser, with the update web site to download appropriate update files for product i and install the update files accordingly. Once the browser is closed and execution transferred back to application 500, operations 462 occur to ask the user whether (s)he completed the update. If the user indicates that the update was completed, then operations 464 occur to update the version number of product i, stored in the registry, to that specified in the update and schedules the next update for this product. Next, through operations 465, if the update script specifies that the user is to re-boot the client PC in order to complete the update, then a suitable notification is displayed to the user instructing the user to do so. Execution of application 500 is then finished for product i. Alternatively, should the user indicate,as a result of operations 462, that the update was not completed, then operations 465 occur to appropriately inform the user about re-booting, if required. In this case, execution of application 500 then finishes, via exit point 466, without any change being made to the product i version number stored in the registry.

In the event a script-based update is to occur for product i, then in response to operations 456, operations 468, rather than operations 458, occur. Through operations 468, application 500 detects the type of operating system then executing at client PC 10. The update script will typically contain O/S-independent and O/S-dependent update files and update parameters. Accordingly, once the particular client O/S has been ascertained, the section of the script corresponding to the particular O/S is then processed to delineate the particular update ("copy" and "run") files that are to be downloaded and their ordering. Thereafter, operations 472 occur at the client PC to issue a separate FTP request to server 70, specifically FTP server 82, to download each separate "copy" file to the client PC. These requests and the resulting downloaded "copy" files are collectively symbolized by line 470. Next, operations 482 occur to issue a separate FTP request to server 70, specifically FTP server 82, to download each separate "run" file to the client PC. These requests and the resulting downloaded "run" files are collectively symbolized by line 480. Once the "run" files are completely downloaded, they are executed in a predefined order specified by the update script.

Once all the "run" files have fully executed, operations 484 are performed to determine whether any user interaction is required, such as issuing an notification to the user and requesting confirmation back from the user. If such interaction is required, then operations 486 occur to determine whether the update has completed. If the user provided such confirmation, then operations 488 occur to update the version number, stored in the registry, of product i and to schedule the next update of this product. These operations are performed, after operations 484, if no user interaction is required. Next, through operations 492, if the update script specifies that the user is to re-boot the client PC in order to complete the update, then a suitable notification is displayed to the user to do so. Once this occurs, execution of application 500, at client PC 10, is finished for product i. Alternatively, if the user signifies that the update was not completed, then operations 488 are not performed and then operations 492 occur to appropriately inform the user about re-booting, if required. In this case, the version number is not updated and the next update of product i is not scheduled.

Figure 5B:
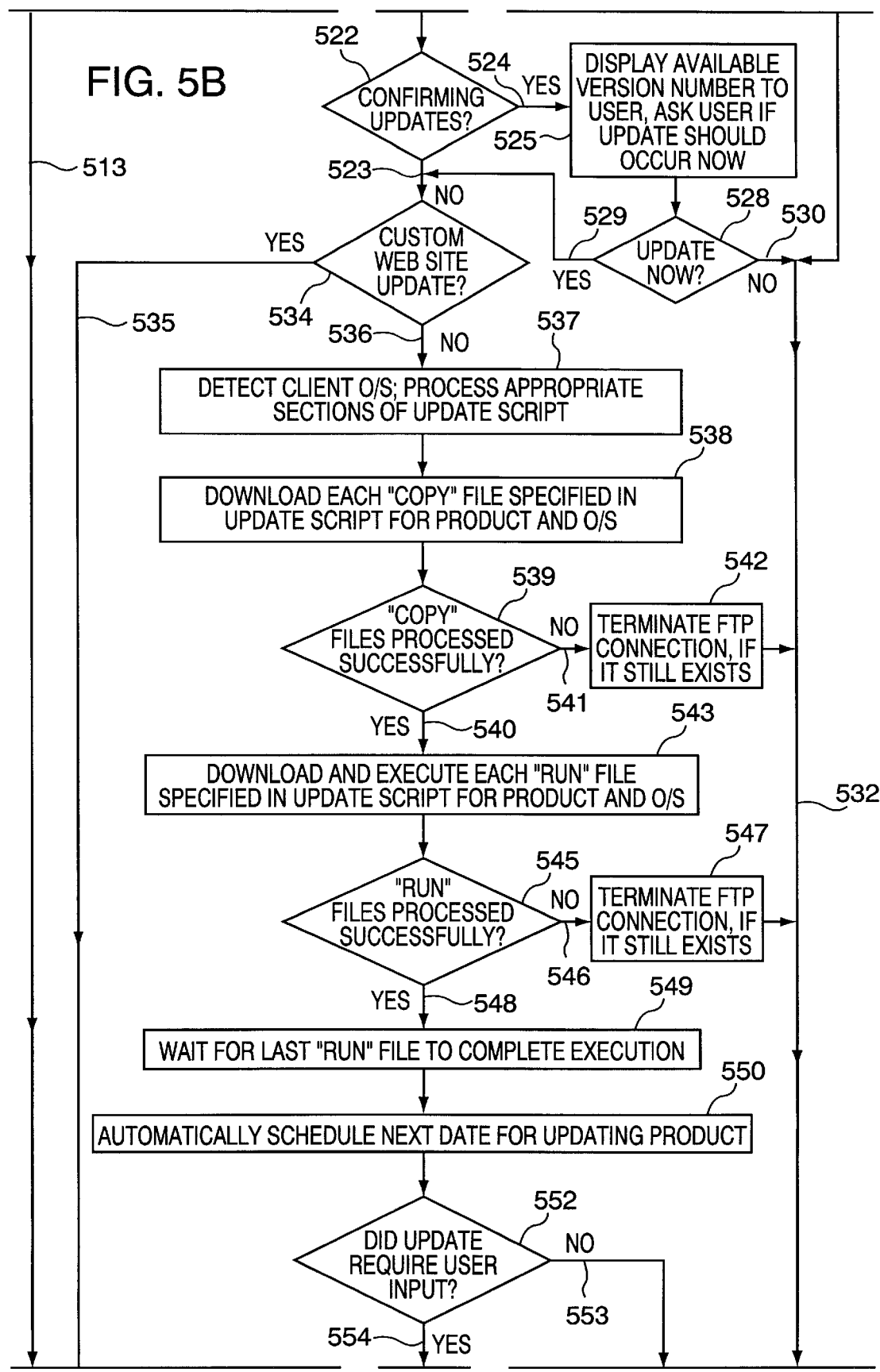
Figure 5C:
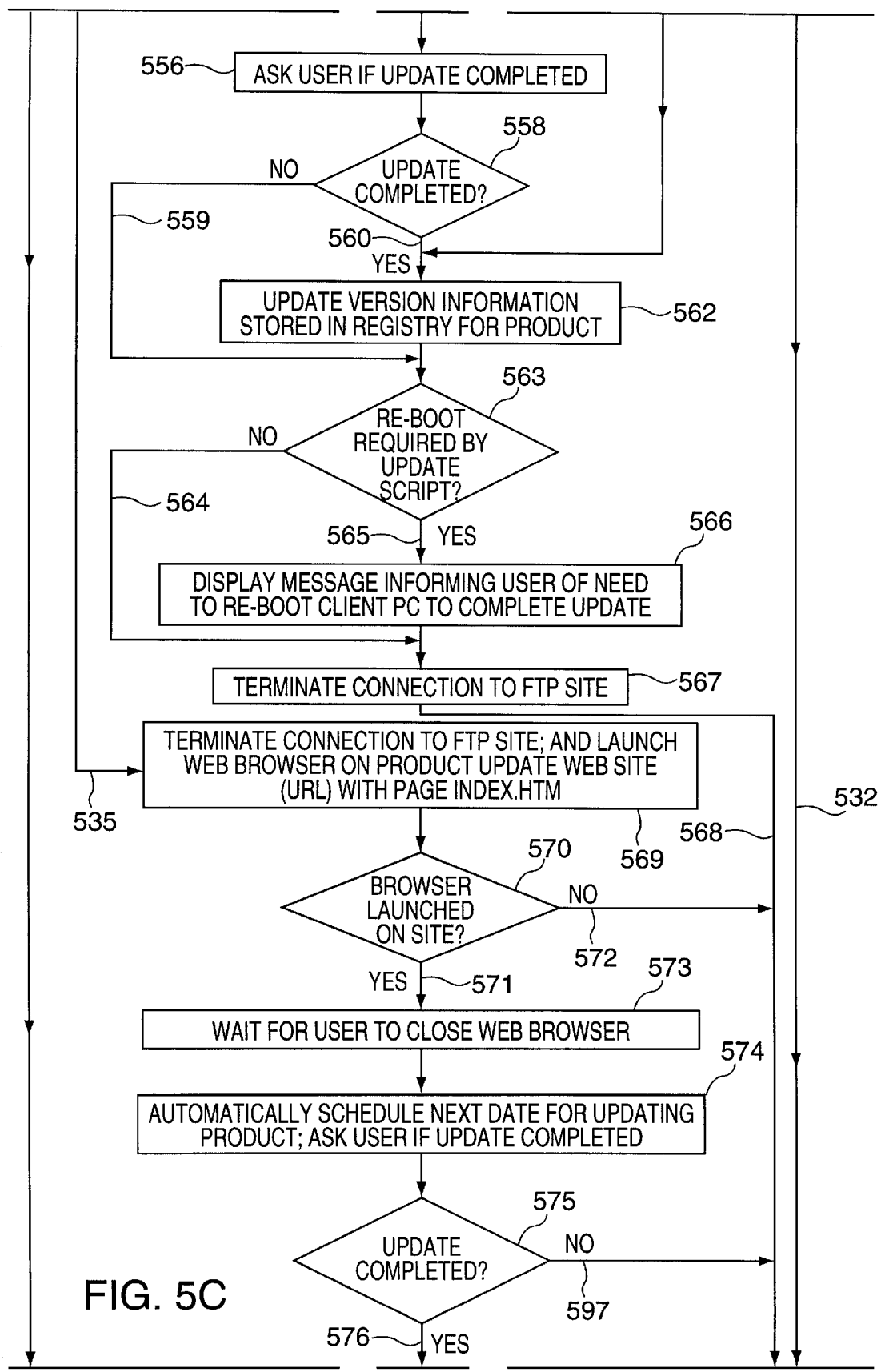

FIGS. 5A–5D collectively depict a detailed flowchart of software updating application 500; the correct alignment of these drawing sheets is shown in FIG. 5.

Upon occurrence of a user-configured date for a product update or a user-initiated update for that product, e.g., software product i, application 500 executes. Within this application, execution first proceeds to block 503 which reads a URL for an FTP update site for this product and then attempts to establish an FTP connection to this site.

Thereafter, execution is directed to decision block 506 which determines whether the FTP connection was made. If the connection was not made, then this decision block routes execution via NO path 507 and path 532, to block 588. Block 588, when executed, automatically schedules a date for the next update for this product. Thereafter, execution proceeds to decision block 590 which, based on a configuration setting, determines whether the user is to confirm updates. If the user has required such confirmation, then decision block 590 routes execution, via YES path 591, to block 594. This latter block, when executed, notifies the user accordingly of the next scheduled update and requests the user to confirm it. Once the user so confirms the update, typically by clicking a displayed "OK" button with his mouse, execution proceeds to block 596 which logs an event, here the inability to connect to the FTP update site. Once the event is logged, execution exits from application 500. Alternatively, if the user has not requested update confirmation, then execution proceeds, via NO path 592 emanating from decision block 590, directly to block 596.

Alternatively, if an FTP connection was successfully established, then decision block 506 routes execution, via YES path 508, to block 510. This latter block, when executed, constructs, as discussed above, a country-specific file name for an update script for product i as "xxx.ini" where "xxx" is the country name in accordance with the ISO 3166 standard. As noted above, a name of a locale-specific script file can be constructed using a different, though predefined, naming convention. For simplicity, such locale-specific files will be ignored hereinafter. Once the file name is constructed, block 510 then issues an FTP request to download this particular file from a script directory associated with the product and residing on the FTP server. Alternatively, however, if no country-specific script is needed or the FTP server indicates that the requested script file could not be found, then block 510 requests a download of a default update script, i.e., "update.ini", from the script directory. Once this occurs, execution proceeds to decision block 511. If the download ultimately failed, i.e., no script file was downloaded, then this decision block routes execution, via NO path 513, to block 586. This latter block, when executed, terminates the connection to the FTP site. Thereafter, execution proceeds to decision block 590 and so forth, as described above, after which execution ultimately exits from application 500.

Alternatively, if the FTP download was successful, then decision block 511 routes execution, via YES path 512, to block 514. This latter block, when executed, reads the product name from registry 247 (see FIG. 2) and from the downloaded update script. Once this occurs, execution proceeds, as shown in FIGS. 5A–5D, to decision block 515 to determine whether these product names match. If the names do not match, indicating that the update on the server is likely to be for a different product, then decision block 515 routes execution, via NO path 516 and path 513, to block 586. This latter block, when executed, terminates the connection to the FTP site. Thereafter, execution proceeds to decision block 590 and so forth, as described above, after which execution ultimately exits from application 500. An improper update is logged as an event.

Alternatively, if the product names match, then decision block 515 directs execution, via YES path 517, to block 518. Block 518, when executed, compares the version number associated with the update against that, as stored in the O/S registry, of the product as currently installed in the client PC. If the update carries a higher version number than the product version stored in the O/S registry, then a resulting updated version of the product would be more current than that which is presently installed. If the version numbers match, then a latest version of the product is that which is currently installed; hence, eliminating any need to update the installed version. Based on the results of this comparison, decision block 519 determines whether an update is available for the product as currently installed in the client PC. If no update is available, i.e., the latest version of the product is currently installed, then this decision block routes execution, via NO path 521 and path 513, to block 586. This latter block when executed, terminates the connection to the FTP site. Thereafter, execution proceeds to decision block 590 and so forth, as described above, after which execution ultimately exits from application 500.

However, if an update is available, then decision block 519 routes execution, via YES path 520, to decision block 522. This latter decision block, based on the update confirmation configuration setting, determines whether the user is to confirm updates. If the user has required such confirmation, then decision block 522 routes execution, via YES path 524, to block 525. This latter block, when executed, displays the version number of the update that is available for installed product i and asks the user whether the update should now proceed or not. Thereafter, execution proceeds to decision block 528 to determine, based on a response from the user, whether the update is to occur now. If the user has indicated that the product should not be updated, typically by having clicked a then displayed "NO" or "CANCEL UPDATE" button (not specifically shown in the figures) with his(her) mouse, then decision block 528 routes execution, via NO path 530 and path 532, to block 588. This block, when executed, automatically schedules a date for the next update for this product, and so forth as described above, after which execution ultimately exits from application 500. Alternatively, if the user has indicated that the update should now proceed, typically by having clicked a then displayed "YES" button with his(her) mouse, decision block 528, routes execution, via YES path 529, to decision block 534. Execution also reaches this latter decision block, via NO path 523, emanating from decision block 522, in the event the update confirmation configuration setting indicates that the user does not want to confirm each update.

Decision block 534, based on a parameter contained in the downloaded update script, determines whether the update is to proceed through a custom web site or through the update script.

If the update is to proceed through the update script, then decision block 534 routes execution, via NO path 536, to block 537. This latter block, when executed, detects the specific O/S then operating in the client PC and processes those sections of the script which are: (a) O/S-independent, and (b) correspond to the detected O/S. This processing entails, given the parameters (as discussed below) in these sections, establishing appropriate lists of "copy" and "run" files to download and determining source directories on the FTP server at which these files are located and destination directories on the client PC into which these files are to be copied and, for the "run" files, executed. The file names for these "copy" and "run" files collectively define an "update file name" set with the corresponding update files themselves defining an "update file" set. Thereafter, execution proceeds to block 538. This block, when executed, downloads each of these "copy" files from its source directory on the FTP site into its destination directory on the client PC. Once this occurs, execution proceeds to decision block 539 which tests whether all the "copy" files were successfully downloaded. If the download of all the "copy" files did not succeed, e.g., a "copy" file could not be downloaded or an error arose during its downloading, then decision block 539 routes execution, via NO path 541, to block 542. If the FTP connection still exists to the update FTP site, block 542 simply terminates this connection. Thereafter, execution is directed, via path 532, to block 588 and so forth, as described above, after which execution ultimately exits from application 500. Alternatively, if all the "copy" files were successfully downloaded, then decision block 539 routes execution, via YES path 540, to block 543. This latter block, when executed, downloads each of the listed "run" files from its source directory on the FTP site into its destination directory on the client PC and then executes each of these files in the order downloaded. Once this occurs, execution proceeds to decision block 545 which tests whether all the "run" files were successfully processed, i.e., downloaded and executed. If the processing of these files did not succeed, e.g., a "run" file could not be downloaded or executed or an error arose during its downloading or execution, then decision block 545 routes execution, via NO path 546, to block 547. If the FTP connection still exists to the update FTP site, this latter block simply terminates this connection. Thereafter, execution is directed, via path 532, to block 588 and so forth, as described above, after which execution ultimately exits from application 500. Alternatively, if all the "run" files successfully processed, then decision block 545 routes execution, via YES path 548, to block 549. To the extent any "run" file is still executing, block 549 simply waits for the last such file to complete its execution. Once all such files have fully executed to install the update, then block 550 executes. This block, when executed, automatically schedules a date for the next update for product i. Thereafter, execution proceeds to decision block 552 which determines, based on the update confirmation configuration setting, whether the user required that (s)he be notified of each update and enter his(her) subsequent acknowledgement of its completion. If so, decision block 552 routes execution, via YES path 554, to block 556. This latter block, when executed, prompts the user to confirm, typically through a mouse click on a button then appearing on the display (display 283 in FIG. 2), that the update has completed. If the user then confirms that the update was completed, then decision block 558, shown in FIGS. 5A and 5B, routes execution, via YES path 560, to block 562. This latter block, when executed, updates the version number, stored in the registry, for product i with the version number provided in the update script. Once this occurs, block 563 determines whether the update script specifies that the user is to re-boot the client PC in order to complete the update. If such a re-boot is required, then this decision block routes execution, via YES path 565, to block 566. This latter block, when executed, displays a suitable notification to the user to re-boot the client PC. Once this occurs, execution proceeds to block 567. Alternatively, is such a re-boot is not required, then execution proceeds directly to block 567 via NO path 564 emanating from decision block 563. Block 567 then executes to terminate the FTP connection. Thereafter, execution proceeds, via path 568, to decision block 582 which, based on a configuration setting, determines whether the user is to confirm updates. If the user has required such confirmation, then decision block 582 routes execution, via YES path 583, to block 585. This latter block, when executed, notifies the user accordingly of the next scheduled update and requests the user to confirm it. Once the user so confirms the update, typically by clicking a displayed "OK" button with his mouse, execution proceeds to block 587 which logs an event, here a successful script-based update. Once the event is logged, execution exits from application 500. Alternatively, if the user has not requested update confirmation, then execution proceeds, via NO path 584 emanating from decision block 582, directly to block 587.

Alternatively, if the update is to proceed through a custom web site, then decision block 534 routes execution, via YES path 535, to block 569. This latter block, when executed, terminates the FTP connection to the update FTP site and launches a browser (e.g., web browser 370 shown in FIG. 3) at the client PC. Block 569, as shown in FIGS. 5A–5D, passes the URL of the update site to the browser and instructs the browser to open page INDEX.HTM, which represents an initial installation web page for product i. Once this occurs, execution proceeds to decision block 570 which determines whether the browser has connected to the update site and opened the page. If the browser is unable to establish a connection to the site and specifically to open this page, then execution proceeds, via NO path 572 and 568, to block 582 and so forth, as described above, after which execution ultimately exits from application 500. Here, the failure of the custom web update will be logged as an event by block 588.

However, once the browser is able to open page INDEX.HTM at the update web site, the user then interacts, through the client PC and the browser, with the update web site to download appropriate update files for product i and install the update files accordingly. As such, execution passes, via YES path 571 emanating from decision block 570, to block 573. Since actual downloading and installation of the update files will proceed through the web site and the browser and with no involvement of application 500 during that interval, block 573 merely waits until the user has closed the browser. Once this occurs, execution proceeds from block 573 to block 574. This latter block, when executed, automatically schedules the next update for product i. Thereafter, decision block 575 executes to determine, based on questioning the user and soliciting an appropriate response, whether the custom web site update completed. If the user indicates, typically through a mouse click on an appropriate button then appearing on the display, that the update completed, decision block 575 routes execution, via YES path 576, to decision block 577. This latter decision block determines whether the update script specifies that the user is to re-boot the client PC in order to complete the update. If such a re-boot is required, then this decision block routes execution, via YES path 579, to block 580. This latter block, when executed, displays a suitable notification to the user to re-boot the client PC. Once this notification occurs, execution proceeds to block 581. Alternatively, if such a re-boot is not required, then execution proceeds to block 581, via NO path 578 emanating from decision block 577. Block 581 updates the version number, stored in the O/S registry, for product i to that specified by the update script. Thereafter, execution proceeds to block 582 and so forth, as described above, after which execution ultimately exits from application 500. Here, the occurrence of a successful web-based update of product i will be logged as an event by block 587. If the custom web site update did not complete, then decision block 575 will route execution, via NO path 597 and path 568, directly to block 582 and so forth, as described above, after which execution ultimately exits from application 500. Here, the occurrence of an incomplete web-based update of product i will be logged as an event by block 587.

Though not specifically shown in the figures, a user could be given an option to cancel an on-going update, but only before updating application 500 has downloaded all the update files from the server. In some instances where a user were to so cancel an on-going update, corruption might arise from a mixture of old (i.e., presently installed) and new (update) software files which could potentially render the software, as it then stands, unusable. To remedy this result while still granting the user such an option, all the update files could be copied, by updating application 500, into a temporary directory on the client PC until after all these update files (i.e., "copy" and "run" files, as appropriate) have been downloaded from the server. In this instance, if the user were to cancel the update, the old files would remain intact, with updating application 500 simply erasing the update files. Alternatively, if the user did not cancel the update, then once all the update, i.e., "copy" and "run", files were downloaded, application 500 would then replace appropriate old files (with exception of any "locked" files) with these new files and then initiate execution of the "run" file(s). As another approach, updating application 500 could copy the old files into a temporary directory and then restore all these old files should the user cancel the update.

With the above description in mind, we will now shift our focus to FIGS. 6–9 and address data flows, among various software modules, particularly including those in updating application 500, for performing four different updating-related functions. Inasmuch as the modules shown are common to these four figures, we will first describe, in conjunction with FIG. 6, the constituent modules in application 500 to the extent necessary and second, with respect to each of these four figures, just describe the different data flow involved therewith. As noted above, application 500 is implemented as an Active X control.

Figure 6:
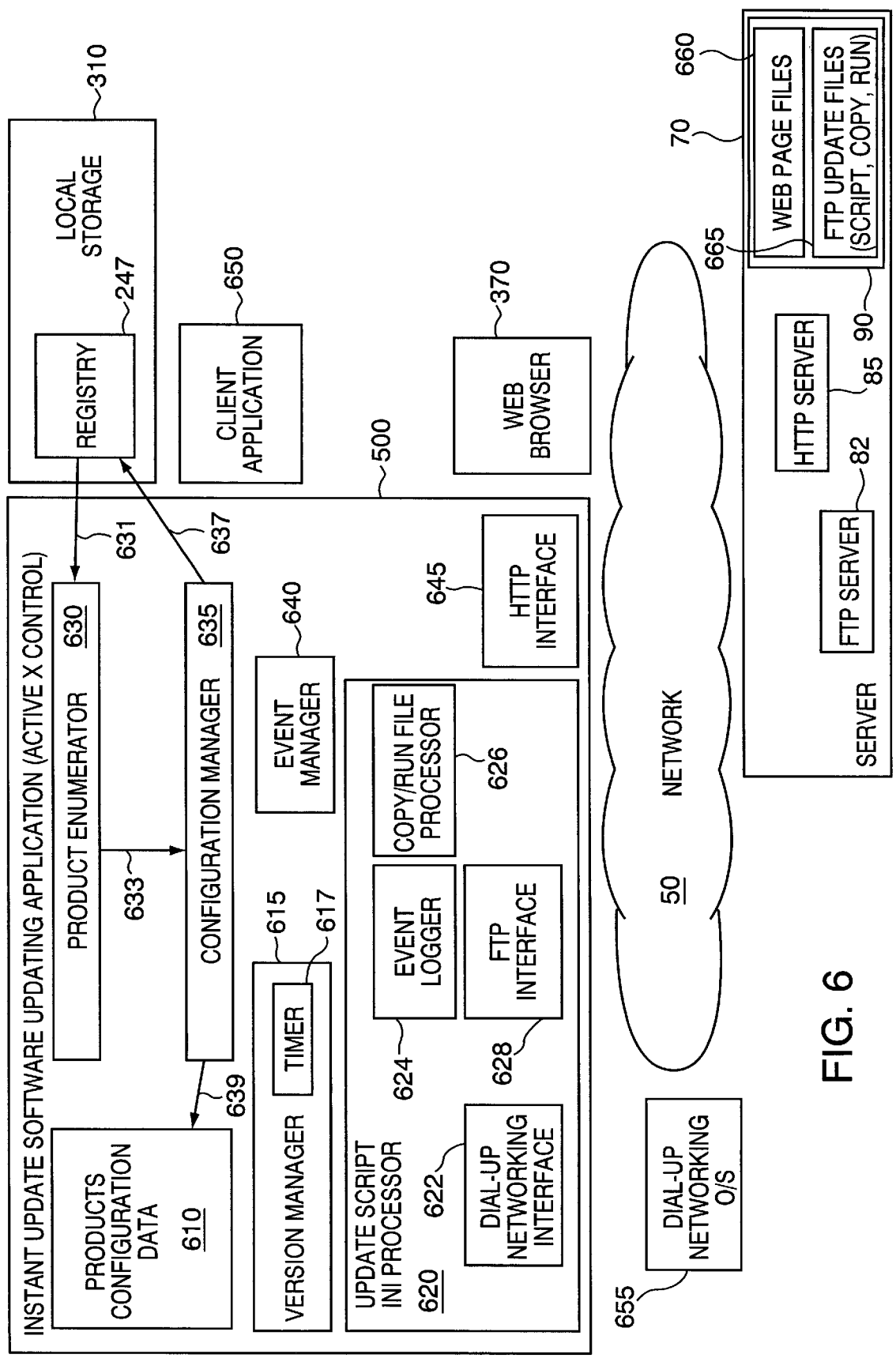
FIG. 6 depicts a high-level block diagram of various software modules, that collectively implement software updating application 500, and data flow occurring among these and associated modules for "detecting" registered products.

As shown in FIG. 6, updating application 500 is formed of products configuration data 610, version manager 615, update script INI processor 620, products enumerator 630, configuration manager 635, event manager 640 and HTTP Interface 645. The version manager includes timer 617; while the update script INI processor includes dial-up networking interface 622, event logger 624, COPY/RUN file processor 626 and FTP interface 628. In addition, the O/S (specifically client O/S 245 shown in FIG. 2) includes dial-up networking component 655. Though shown separately from local storage 310 for purposes of facilitating understanding, all the modules depicted in FIG. 6, with the exception of those in server 70, reside in local storage 310 (see FIG. 3).

As to each of these modules, data 610, shown in FIG. 6, stores configuration data for each product that has registered itself to be updated by application 500. This data includes a copy of the configuration and product data, as will be described below, that is written into the registry during installation of each such product. This data also includes configuration settings which the user, at the client PC, has entered through configuration application 25 (see FIGS. 1 and 3) and specifically through various configuration screen displays shown in FIGS. 14A–14D. Version manager 615, shown in FIG. 6, monitors the version number of each product that has registered itself to be updated by application 500. Update script INI processor 620 processes the update script as received from an FTP server; the file for this script being, as discussed above, either "xxx.ini" or "update.ini". Within processor 620, dial-up networking interface 622 generates appropriate instructions and passes appropriate user account and password information to dial-up networking O/S component 655 in order to establish a dial-up networked connection to an FTP update site or close that connection. Processor 626 copies appropriate "copy" files from an FTP server specified in the script and also copies and executes, in the sequence specified by the script, appropriate "run" files. Product enumerator 630 reads registry 247 and dynamically specifies all products that have registered themselves to be updated by updating application 500. Configuration manager 635 reads and writes product registration and configuration information in data 610 and registry 247, respectively. The functions provided by event manager 640, event logger 624, FTP interface 628 and HTTP interface 645 are all self-evident, without further explanation, to those skilled in the art. Though illustratively shown as client application 650, this application broadly includes any software, whether it is an application program, driver, firmware or O/S, for which an update becomes available.

FIG. 6, in addition to depicting these modules, also shows data flow that arises among these modules associated with "detecting" those products that have registered themselves to be updated through our inventive technique.

In particular, to utilize our inventive updating technique, an installation process for a product is modified, in the manner discussed below in conjunction with FIG. 11, to establish various entries under a single sub-key in the O/S registry. To minimize a burden placed on an installation program for this product, this program only creates entries under a single sub-key in the registry to effect product registration. However, use of our inventive technique with any item of software requires additional data beyond that which is created in the sub-key during product registration. This additional data is created and stored during product "detection". In that regard, once a user has installed a product and that product has registered itself for use with our inventive technique, then, if update application 15 is currently executing, "detection" can be initiated through use of configuration application 25 (see FIG. 3) and specifically by the user clicking on a "DETECT" button produced by this application and appearing on "common" configuration screen display 1410 shown in FIG. 14A. In this instance, the configuration application will determine the necessary data from existing data in the registry and store the former appropriately in both the registry and product configuration data 610. Once this occurs, then the product can be automatically updated through our technique, as well as can any of the update configuration data for that product. Rather than separately clicking on the "DETECT" button each time a new product has been installed, a user can install a number of products on his(her) client PC and then click the "DETECT" button once to collectively "detect" all of them and effectuate automatic updating therefor. In addition, product "detection" will also occur automatically whenever execution of update application 15 is initiated, such as manually through clicking on an icon or automatically through execution of a start-up group in a Windows O/S. Hence, the only time that the user needs to depress the "DETECT" button would be if, while application 15 is executing, the user decides to install a new product that registers itself with application 15 and the user does not want to close application 15 and re-launch its execution.

Specifically, once "detection" is initiated, then, as represented by line 631, product enumerator 630 first reads registry 247 and forms a list of all such products that have registered themselves for updating through the present invention, i.e., those products then having entries under particular product sub-keys in registry 247. Once this list is generated, product enumerator 630 passes, as symbolized by line 633, this list to configuration manager 635. The configuration manager, in turn, accesses the registry for all additional data which will be needed for automatically updating each of these registered products. The configuration manager then constructs, as symbolized by line 637, entries containing update configuration data for each such product, in a configuration sub-key in registry 247, so as to form a default working update configuration (see, e.g., for an illustrative "Cobra-DSL" product, those entries in configuration sub-key 1250 shown in FIG. 12B which will be discussed below), in the registry, encompassing all such registered products. Lastly, for redundancy, configuration manager 635, as shown in FIG. 6, will also store, as symbolized by line 639, all the update configuration and product data existing in the registry in products configuration data 610.

Figure 7:
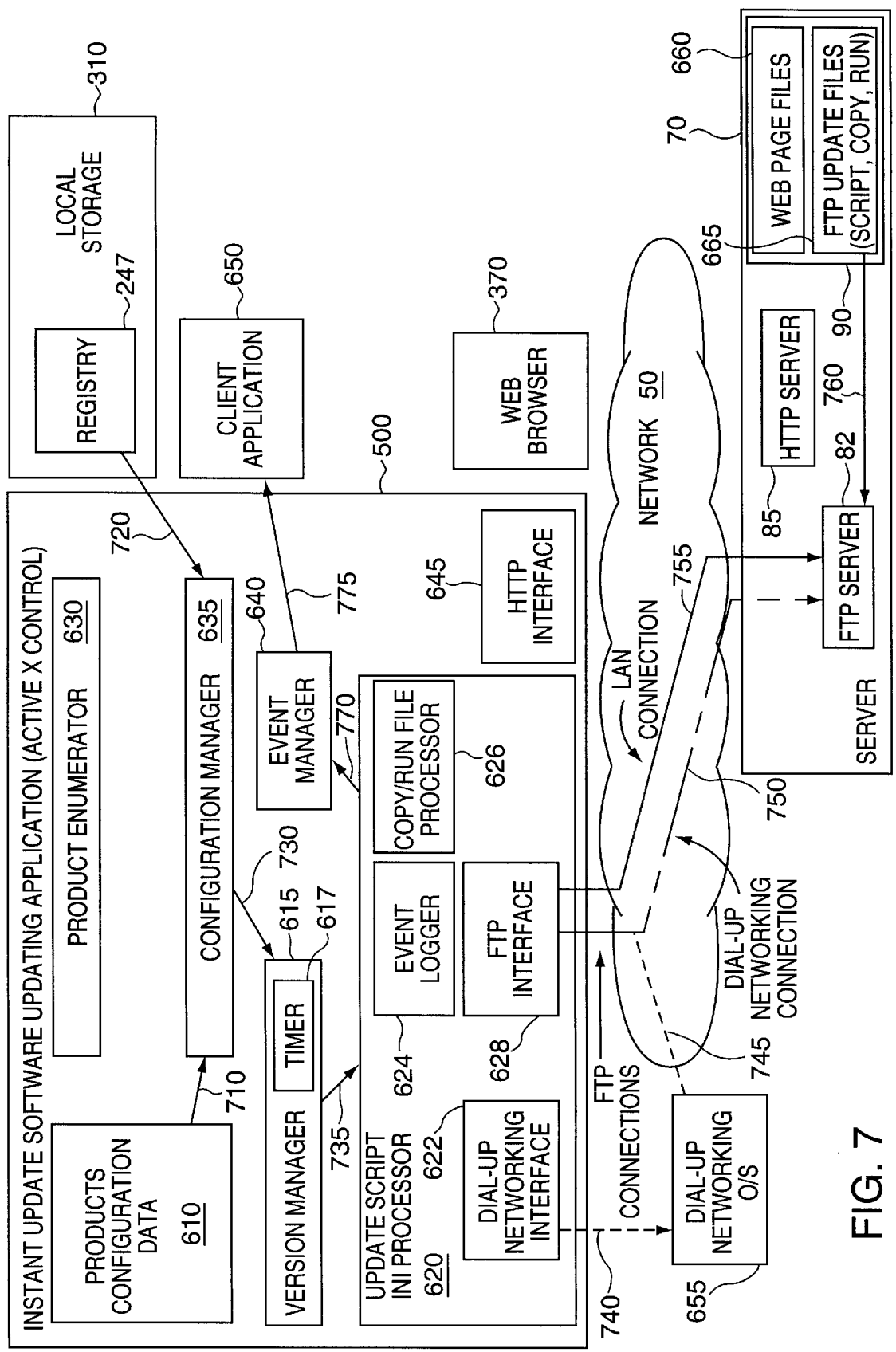
FIG. 7 depicts a high-level block diagram of various software modules, that collectively implement software updating application 500, and data flow occurring among these and associated modules for determining, based on a version of a registered product, whether an update to a new version currently exists for that product.

FIG. 7, in addition to depicting the modules shown in FIG. 6, also shows data flow that arises among these modules for determining, based on a version of a registered product, whether an update to a new version currently exists for that product.

In particular, once a date, indicated in products configuration data 610, has occurred to update a registered product, then configuration manager 635 reads an FTP update site address (URL) for this product from registry 247. The accompanying data flow is indicated by lines 710 and 720. Thereafter, the configuration manager passes, as symbolized by line 730, this URL to version manager 615. Once this occurs, then the version manager instructs, as symbolized by line 735, update script INI processor 620 to establish an FTP connection, via FTP interface 628, to an FTP server (here illustratively FTP server 82 on server 70) designated by this URL. Based on configuration settings stored within products configuration data 610 for the type of connection to establish, processor 620 establishes this connection through network 50 either through a LAN connection, such as a dedicated network connection, as symbolized by line 755, or on a dial-up basis, as symbolized by line 750. Based on the type of connection to be established, processor 620 reads appropriate access information from the working update configuration, e.g., user name and password and, for dial-up connections, a telephone number of a remote access port for the network. Should a dial-up connection be required, processor 620 passes the user name, password and telephone number to dial-up network interface 622. This interface suitably instructs, as symbolized by dashed line 740, dial-up networking O/S component 655 to establish, as symbolized by dashed line 745, a network connection, through a public switched telephone network, between the client PC and network 50. In any event, once version manager 615 issues an instruction to establish a connection, it also instructs timer 617 to time a predefined time-out interval and so notify update script processor 620 at the end of this interval. If the FTP connection is not established by the end of this interval, processor 620 will so inform event manager 640, shown in FIG. 6, which, in turn, will log, as an event, a failure to establish a network connection within this time-out interval.

If, however, the FTP connection was established within the time-out interval, then processor 620 constructs an appropriate country-specific file name, where appropriate and as described above, for an update script for the product and then issues an FTP request to FTP server 82 to download this file. In response to this request, FTP server 82 access, as symbolized by line 760, this file from FTP update files 665 stored within file store 90 and then downloads this file to the client PC. Once this file is downloaded, processor 620 checks the product name and version number stored within the update script, as described above. Lastly, if, for the product being updated, the version number of the available update exceeds that of the version number, as stored in products configuration data 610 (and registry 247) for this product, processor 620 fires an event, via event manager 640, to client application 650 informing the latter that a new version of the product is available (assuming the user has configured updating application 500 to confirm all updates).

Figure 8:
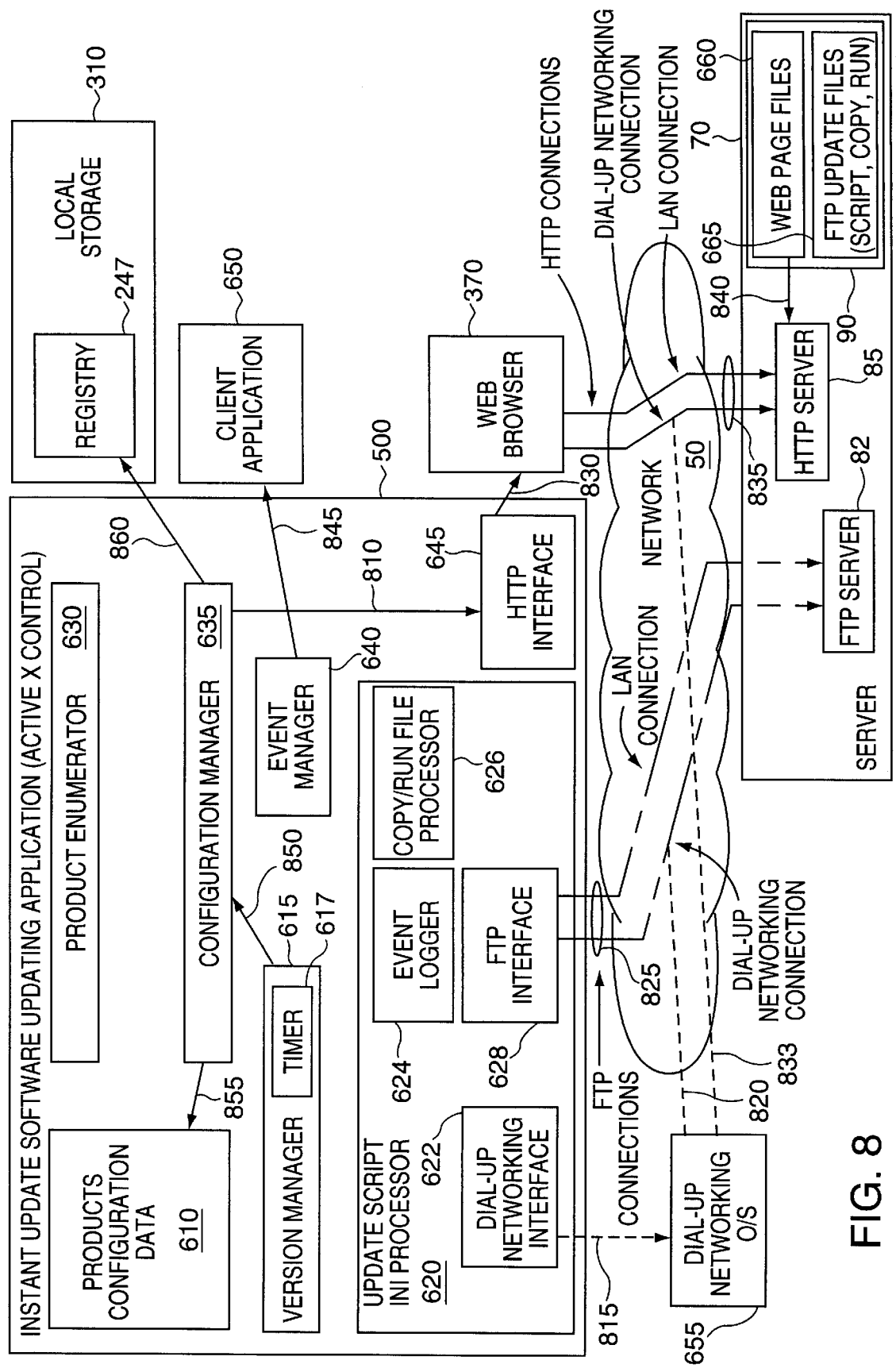
FIG. 8 depicts a high-level block diagram of various software modules, that collectively implement software updating application 500, and data flow occurring among these and associated modules for implementing a custom web site update.

FIG. 8, in addition to depicting the modules shown in FIG. 6, depicts data flow occurring among these modules for implementing a custom web site update.

Here, once processor 620 has read the update script and determined that a custom web based update, rather than a script-based update is to occur, then, upon instruction of this processor, configuration manager 635 passes, as symbolized by line 810, the URL for the update web site to HTTP interface 645. The configuration manager also determines the connection method to be used in establishing an HTTP connection to a remote web server (here HTTP server 85) and passes this information to processor 620.

Processor 620 then terminates a then existing FTP connection 825 to FTP server 82. This connection, as noted above, can be either a dial-up connection or a LAN connection. If the connection is a dial-up connection, processor 620 first closes the FTP connection, via FTP interface 628, and then terminates the physical connection by issuing an appropriate command to dial-up networking interface 622. Interface 622 then issues appropriate instructions, as symbolized by dashed line 815, to dial-up networking O/S component 655, which, in turn, as symbolized by line 820, physically terminates the dial-up connection. If the connection to FTP server 82 is a LAN connection, processor 620 terminates that connection through FTP interface 628.

Once the FTP connection is completely terminated, processor 620 establishes an HTTP connection to HTTP server 85. If this connection is to be a dial-up connection, processor 620 passes the user name, password and telephone number to dial-up network interface 622. This interface suitably instructs, also as symbolized by dashed line 815, dial-up networking O/S component 655 to establish, as symbolized by dashed line 833, a network connection, through a public switched telephone network, between the client PC and network 50. HTTP interface 645 launches browser 370 and passes the URL of the update web site to the browser with an instruction to open page INDEX.HTM at that site; these operations are symbolized by line 830. As a result, the browser establishes an HTTP connection, either through a dial-up connection or a LAN connection (these connections being collectively denoted as connections 835), to HTTP server 85. The user then interacts with web browser 370 and HTTP server 85 to access, as symbolized by line 840, web pages for the update from web page files 660 in file store 70 and download those pages to the browser for suitable processing at the client PC.

Once browser 370 has been closed, event manager 640 fires, as symbolized by line 845, an event to client application 650 to ask the user if the update has been completed. If the user responds that the update is complete, version manager 615 passes, as symbolized by line 850, the new version number of the product, as now updated, to configuration manager 635. The configuration manager updates, as symbolized by lines 855 and 860, the version number, of this product, as stored in products configuration data 610 and registry 247 to match the version number associated with the update. Thereafter, if a dial-up connection was established to connect to network 50, processor 620, through dial-up networking interface 622, suitably instructs dial-up networking O/S component 655 to close the dial-up connection between the client PC and a remote access port for network 50.

Figure 9:
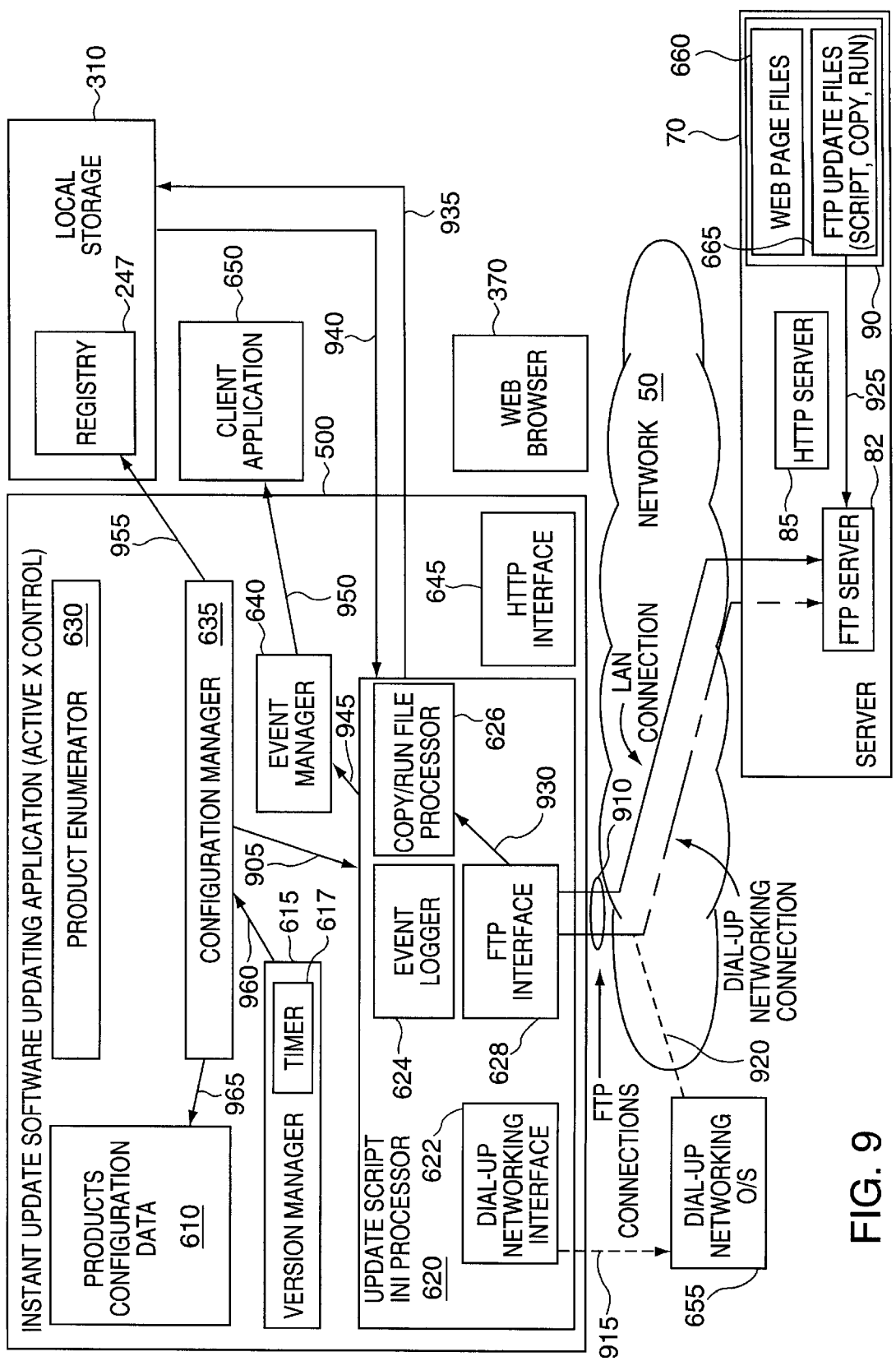
FIG. 9 depicts a high-level block diagram of various software modules, that collectively implement software updating application 500, and data flow occurring among these and associated modules for implementing a script-based update.

FIG. 9, in addition to depicting the modules shown in FIG. 6, depicts data flow occurring among these modules for implementing a script-based update.

Here, once processor 620 has read the update script and determined that a script-based update is to occur, then, upon instruction of this processor, configuration manager 635 detects, through a conventional API call to the client O/S, the type of O/S (e.g., Windows 95 O/S, Windows NT O/S, etc.) then executing at the client PC. Once the O/S type has been detected, the configuration manager passes, as symbolized by line 905, the O/S type to processor 620. With this type information, processor 620 parses the update script to extract: an O/S-independent section and an O/S-specific section for the particular O/S type—to the extent these sections (either or both) exist in the script. These sections, as noted, each contain separate lists of "copy" and, where applicable, "run" files, as well as an optional README file that will be displayed at the client PC before any further files will be downloaded. At this point and as discussed above, an FTP connection will have been established, either through a LAN or dial-up connection (the latter through dial-up networking interface 622 and dial-up O/S networking component 655) collectively being connections 910, via network 50, to FTP server 82. Once the separate lists of the "copy" and "run" files have been extracted and typically after any README file has been downloaded and displayed (in the discretion of the user), the "copy" files are accessed, as symbolized by line 925, in list order, by FTP server 82 from FTP update files 665 in file store 70 and from there downloaded to the client PC and specifically, as symbolized by line 935, to local storage 310. Thereafter, the "run" files are accessed, in list order, by FTP server 82, as symbolized by line 925, from FTP update files 665 in file store 70 and from there downloaded to the client PC and specifically, also symbolized by line 935, to local storage 310. Once all the "run" files are downloaded, processor 620 executes, as symbolized by line 940, each of the "run" files from local storage 310 and in the order downloaded.

After all the "run" files have been executed and hence processor 620 has finished processing the update script, this processor suitably notifies, as symbolized by line 945, event manager 640. The event manager fires, as symbolized by line 950, an event to client application 650 to gain confirmation from the user that the update was completed (but only if the user has previously requested, during configuration, that such confirmation is to occur). If the update is complete, version manager 615 passes, as symbolized by line 960, the new version number of the product, as now updated, to configuration manager 635 which, in turn, suitably updates, as symbolized by lines 965 and 955, the version number, of the product, stored in both product configuration data 610 and registry 247, respectively, to match that of the update. Thereafter, if a dial-up connection was established to connect to network 50, processor 620, through dial-up networking interface 622, suitably instructs, as symbolized by dashed line 915, dial-up networking O/S component 655 to close the dial-up connection between the client PC and a remote access port for network 50. In response to this instruction, component 655 physically terminates this connection, with this operation symbolized by dashed line 920.

Figure 10:
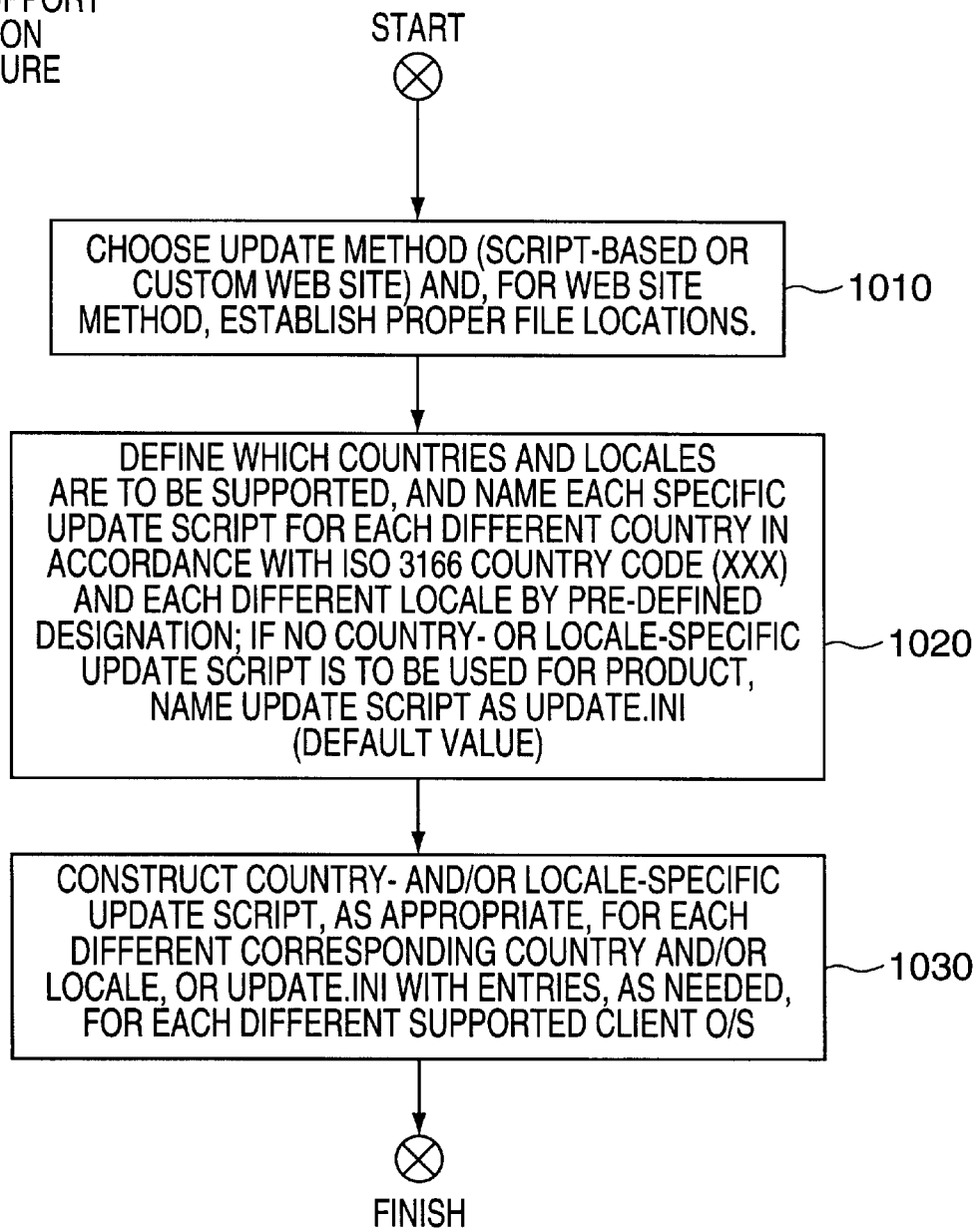
FIG. 10 depicts a high-level flowchart of process 1000 for creating files on a network server, such as, e.g., server 70, which support our inventive updating technique.

FIG. 10 depicts a high-level flowchart of process 1000 for creating files on a network server, such as, e.g., server 70, which support our inventive software technique for updating a product.

In particular, upon start of this process, an owner of an update site (either, e.g., a manufacturer or a network administrator) would first decide, as depicted by block 1010, on a specific update method to use in updating the product, i.e., a custom web site update or a script-based update. If a custom web site update is to be used, the owner would then define proper file locations. In particular, the custom web site update, as discussed above, launches on an INDEX.HTM page file defined on the server. This file needs to reside in a directory which is identified in an update script by the contents of parameter UpdateIniDirectory. Updating application 500 interprets this URL as an HTTP address and the contents of UpdateIniDirectory as a subdirectory off an HTTP root directory of the server. The owner would also specify custom web site update within the update script as the updating method to use.

Thereafter, as indicated in block 1020, the owner defines each country (or locale, where applicable) that is to be supported through a different update script. The file for each script is then named using the ISO 3166 three-letter naming convention, as discussed above, for each different country and a predefined different convention for each different locale. The same conventions are used by updating application 500 to create these file names. If no country- or locale-specific update script is to be used then a single default update script is named "update.ini".

Once all the scripts are named, the owner, as depicted in block 1030, constructs the update script for each country or locale or, where appropriate, the default update script. All of these scripts are stored in separate files in a sub-directory, on the server, specified by the contents of the UpdateIniDirectory parameter.

In particular, as an example, assume that an update site owner wants to support two different updates of a product: one for the United States, and another for Japan. In this case, (s)he would create two separate update script files labeled "USA.ini" and "JPN.ini", respectively, and place those files within the UpdateIniDirectory FTP sub-directory on the server. As another example, assume the owner now wants to support updates in three countries, such as the United States, Canada and France, with the update being the same for the United States and Canada but different in France. In this case, the owner would create three update scripts named "USA.ini", "CAN.ini" and "FRA.ini" with, other than a change of file name, the contents of the first two scripts being identical. However, the third file, "FRA.ini", would have a different update script. If a product update is not country- or locale-specific, e.g., a product targeted at users just in the United States, the update for this product could be named either "USA.ini" or "update.ini".

The update script is specifically constructed to contain the following sections and entries therein. For each section (designated by a name in bold and contained in brackets), each parameter name (just in bold) is listed, along with its data type (string or integer), range of values (if applicable), whether or not that parameter is mandatory, and a short explanation for how updating application 500 uses that parameter. Those sections indicated by bolded brackets are mandatory. All parameter name/value entries below take the form <parameter name>=<value> in the update.ini script.

[Main]

This section contains header information for a given update and product. For a custom web site update, the update script will only contain this section. However, for a script-based update, the script will contain this section and, to the extent required by the specific update, one or more of the other sections.

ProductName (STRING) [MANDATORY]

The contents of this parameter specify the name of the product to which this script applies.

CurrentVersion (STRING) [MANDATORY]

The value of this parameter specifies the version of the update that is available on the server.

CustomupdateSite (INTEGER) [0=No, 1=Yes]
The value of this parameter informs updating application 500 whether or not this product uses custom web site updating.

[OsIndependent]
This section contains instructions for product files that are updated for all client operating systems, regardless of their type.

ReadmeFile (STRING) [OPTIONAL and used if no ReadmeFile parameter is present in a section below corresponding to the specific client O/S].

The contents of this parameter specify a name of README file on the server (in ReadmeFileDirectory FTP subdirectory—see below) that should be displayed, for any client O/S, to the user during the update.

ReadmeFileDirectory (STRING) [OPTIONAL, unless the ReadmeFile parameter has been provided]

The contents of this parameter specify an FTP subdirectory (relative to FTP root directory) on the server where the README file is located.

NumberOfCopyFiles (INTEGER) [MANDATORY]

The value of this parameter specifies a number of "copy" files that will be copied from the server to the client PC.

NumberOfRunFiles (INTEGER) [MANDATORY]

The value of this parameter specifies a number of "run" files that will be copied from the server to the client PC and then executed (in the order in which they appear below).

CopyFileSrcDir1 (STRING) [MANDATORY, if the value of NumberOfCopyFiles parameter≧1]

This parameter specifies an FTP subdirectory, relative to FTP root directory, on the server where the first "copy" file is located.

CopyFileSrcFile1 (STRING) [MANDATORY, if the value of the NumberOfCopyFiles parameter≧1]

This parameter specifies a name of a first "copy" file located in the CopyFileSrcDir1 FTP subdirectory on the server.

CopyFileDestDir1 (STRING) [MANDATORY, if the value of the NumberOfCopyFiles parameter≧1]

This parameter specifies a destination directory on the client PC into which updating application 500 is to write the "copy" file specified in the CopyFileSrcFile1 parameter. This string can be one of the following values:

"$TEMP$"

The "copy" file is to be written to a temporary directory used by updating application 500 (usually because this "copy" file is used by a RunFileSrcFile, as shown in an example below).

"$WINDIR$"

The "copy" file is to be written into the Windows O/S directory.

"$WINSYSDIR$"

The "copy" file is to be written into a Windows O/S system directory.

"$INSTALLDIR$"

The "copy" file is to be written into a directory on the client PC into which the product is installed.

<Absolute directory path>

The "copy" file is to be written into a given absolute directory path on the client PC.

By appending "\", followed by a relative directory path, to $TEMP$, $WINDIR$, $WINSYSDIR$, or $INSTALLDIR$, a subdirectory of any of these directories can be designated. For example, to designate \WINDOWS\TEMP directory on the client PC, the contents for parameter CopyFileDestDir would be: $WINDIR$\TEMP.

CopyFileRequiresReboot1 (INTEGER) [MANDATORY, if the value of the NumberOfCopyFiles parameter≧1]

The value, 0 or 1, of this parameter specifies whether or not an update of this "copy" file will require the user to reboot the client O/S or not, respectively.

There will be a set of CopyFileSrcDir, CopyFileSrcFile, CopyFileDestDir, and CopyFileRequiresReboot parameters for each "copy" file (the number in the set being given by a value of the NumberOfCopyFiles parameter). All parameter name indices should increment by one for each successive "copy" file (starting at the index "1").

RunFileSrcDir1 (STRING) [MANDATORY, if the value of the NumberOfRunFiles parameter≧1]

The contents of this parameter specify an FTP subdirectory, relative to FTP root directory, on the server where the first "run" file is located.

RunFileSrcFile1 (STRING) [MANDATORY, if the value of the NumberOfRunFiles parameter≧1]

The contents of this parameter specify a name of a "run" file located in the RunFileSrcDir1 FTP subdirectory on the server.

RunFileDestDir1 (STRING) [MANDATORY, if the value of the NumberOfRunFiles parameter≧1]

The destination directory on the client PC) where updating application 500 is to copy the RunFileSrcFile1 file. This string can be one of the following values:

"$TEMP$"

The "run" file is to be copied to written to a temporary directory used by updating application 500 (usually because this "run" file is used by a RunFileSrcFile, as shown in an example below).

"$WINDIR$"

The "run" file is to be written into the Windows directory.

"$WINSYSDIR$"

The "run" file is to be written into a Windows O/S system directory.

"$INSTALLDIR$"

The "run" file is to be written into a directory on the client PC into which the product is installed.

<Absolute directory path>

The "run" file is to be written into a given absolute directory path on the client PC.

By appending "\", followed by a relative directory path, to $TEMP$, $WINDIR$, $WINSYSDIR$, or $INSTALLDIR$, a subdirectory of any of these directories can be designated. For example, to designate \WINDOWS\TEMP directory on the client PC, the contents for parameter RunFileDestDir would be: $WINDIR$\TEMP.

RunFileRequiresReboot1 (INTEGER) [MANDATORY, if the value of the NumberOfRunFiles parameter≧1]

The value, 0 or 1, of this parameter specifies whether or not an update of this "run" file will require the user to reboot the client O/S or not, respectively.

RunFileUserInteraction1 (INTEGER) [MANDATORY, if the value of the NumberOfRunFiles parameter≧1]

The value, 1 or 0, of this parameter specifies whether or not this update requires user interaction or not, respectively. Updating application 500 uses this value to determine whether it should ask the user if (s)he completed an update, as discussed above, such that this application could then update the version number, for this product, stored in the O/S registry.

RunFileCommandline1 (STRING) [OPTIONAL]

The contents of this parameter specify command line arguments to feed the executable (*.EXE) "run" file when that file is launched.

RunFileWait1 (INTEGER) [OPTIONAL]

The value, 1 or 0, of this parameter specifies whether or not, respectively, updating application 500 should wait for the "run" (executable) file to complete its execution. This parameter is not used if the value of the NumberOfRunFiles parameter is less than two or this "run" file is the last one to be executed.

There will be a set of RunFileSrcDir, RunFileSrcFile, RunFileDestDir, RunFileRequiresReboot, and RunFileUserInteraction values for each "run" file (depending on a value of the NumberOfRunFiles parameter (see examples below). All parameter name indices should increment by one for each successive "run" file (starting at the index "1").

[Windows95]

This section is mandatory only if the product is executing on a client PC that is running a Windows 95 O/S. This section, which uses the same parameter naming convention as in the O/S independent section, contains update parameters for all Windows 95 specific files.

[WindowsNt40]

This section is mandatory only if the product is executing on a client PC that is running a Windows NT version 4.0 O/S (either client or workstation version). This section, which uses the same parameter naming convention as in the O/S independent section, contains update parameters for all Windows NT 4.0 specific files.

[Windows98]

This section is mandatory only if the product is executing on a client PC that is running a Windows 98 client O/S. This section, which uses the same parameter naming convention as in the O/S independent section, contains update parameters for all Windows 98 specific files.

[WindowsNt50]

This section is mandatory only if the product is executing on a client PC that is running a Windows NT version 5.0 O/S (either client or workstation version). This section, which uses the same parameter naming convention as in the O/S independent section, contains update parameters for all Windows NT 5.0 specific files.

Given the specific manner, as described above, for constructing an update script, to facilitate clear reader understanding, we will now present two example update scripts in Tables 1 and 2 below. In both example scripts, comments are preceded by semi-colons.

Table 1 below provides an illustrative update script for updating just O/S-independent files for a product named "BrowningLite". This update runs an "InstallShield" executable ("InstallShield" is a registered trademark of InstallShield Corporation); hence, all update files are copied to a temporary directory (or a subdirectory of that directory). None of the update files requires a reboot of Windows.

TABLE—First Example Update Script

[Main]
ProductName=BrowningLite
CurrentVersion=1.3b
CustomUpdateSite=0
[OsIndependent]
ReadmeFile=README.TXT
ReadmeFileDirectory=BrowningLite/ENGLISH
NumberOfCopyFiles=4
NumberOfRunFiles=1
COPY FILES
CopyFileSrcDir1=BrowningLite
CopyFileSrcFile1=BROWNING.EXE
CopyFileDestDir1=$TEMP$
CopyFileRequiresReboot1=0
CopyFileSrcDir12=BrowningLite
CopyFileSrcFile12=MODEMDSC.INI
CopyFileDestDir12=$TEMP$
CopyFileRequiresReboot12=0
CopyFileSrcDir13=BrowningLite
CopyFileSrcFile13=SETUP.INS
CopyFileDestDir13=$TEMP$
CopyFileRequiresReboot13=0
CopyFileSrcDir14=BrowningLite/ENGLISH
CopyFileSrcFile14=README.TXT
CopyFileDestDir14=$TEMP$\ENGLISH
CopyFileRequiresReboot14=0
;RUN FILES
RunFileSrcDir1=BrowningLite
RunFileSrcFile1=SETUP.EXE
RunFileDestDir1=$TEMP$
RunFileRequiresReboot1=0
RunFileUserInteraction1=1
[Windows95]
NumberOfCopyFiles=0
NumberOfRunFiles=0
[WindowsNt40]
NumberOfCopyFiles=0
NumberOfRunFiles=0
[Windows98]
NumberOfCopyFiles=0
NumberOfRunFiles=0
[WindowsNt50]
NumberOfCopyFiles=0
NumberOfRunFiles=0

Table 2 below provides an illustrative update script for updating O/S-independent and O/S-specific files, for the Instant Update client application (application 15 shown in FIGS. 1 and 2) itself, for illustratively the Windows 95 O/S. This script also copies a README file from the Windows 95 section of the script, if the client is running Windows 95, or if not, from the OS-independent section. The script contains no "run" files and does not require a reboot of the client O/S.

TABLE 2—Second Example Update Script

[Main]
ProductName=Instant Update
CurrentVersion=1.1.0.0
CustomUpdateSite=0
[OsIndependent]
ReadmeFile=README.TXT
ReadmeFileDirectory=InstantUpdate/ENGLISH
NumberOfCopyFiles=2
NumberOfRunFiles=0
;COPY FILES
CopyFileSrcDir1=InstantUpdate
CopyFileSrcFile1=FILECOPY.AVI
CopyFileDestDir1=$INSTALLDIR$
CopyFileRequiresReboot1=0
CopyFileSrcDir12=InstantUpdate
CopyFileSrcFile12=FINDCOMP.AVI
CopyFileDestDir12=$ INSTALLDIR $
CopyFileRequiresReboot12=0
;RUN FILES
;NONE
[Windows95]

```
ReadmeFile=README.TXT
ReadmeFileDirectory=InstantUpdate/95/ENGLISH
NumberOfCopyFiles=2
NumberOfRunFiles=0
CopyFileSrcDir1=InstantUpdate/95
CopyFileSrcFile1=INSTUPDT.SYS
CopyFileDestDir1=$WINSYSDIR$
CopyFileRequiresReboot1=1
CopyFileSrcDir12=InstantUpdate/95
CopyFileSrcFile12=INSTUPDT.INF
CopyFileDestDir12=$WINDIR$\INF
CopyFileRequiresReboot12=0
;RUN FILES
;NONE
[WindowsNt40]
NumberOfCopyFiles=0
NumberOfRunFiles=0
[Windows98]
NumberOfCopyFiles=0
NumberofRunFiles=0
[WindowsNt50]
NumberOfCopyFiles=0
NumberofRunFiles=0
```

Figure 11:
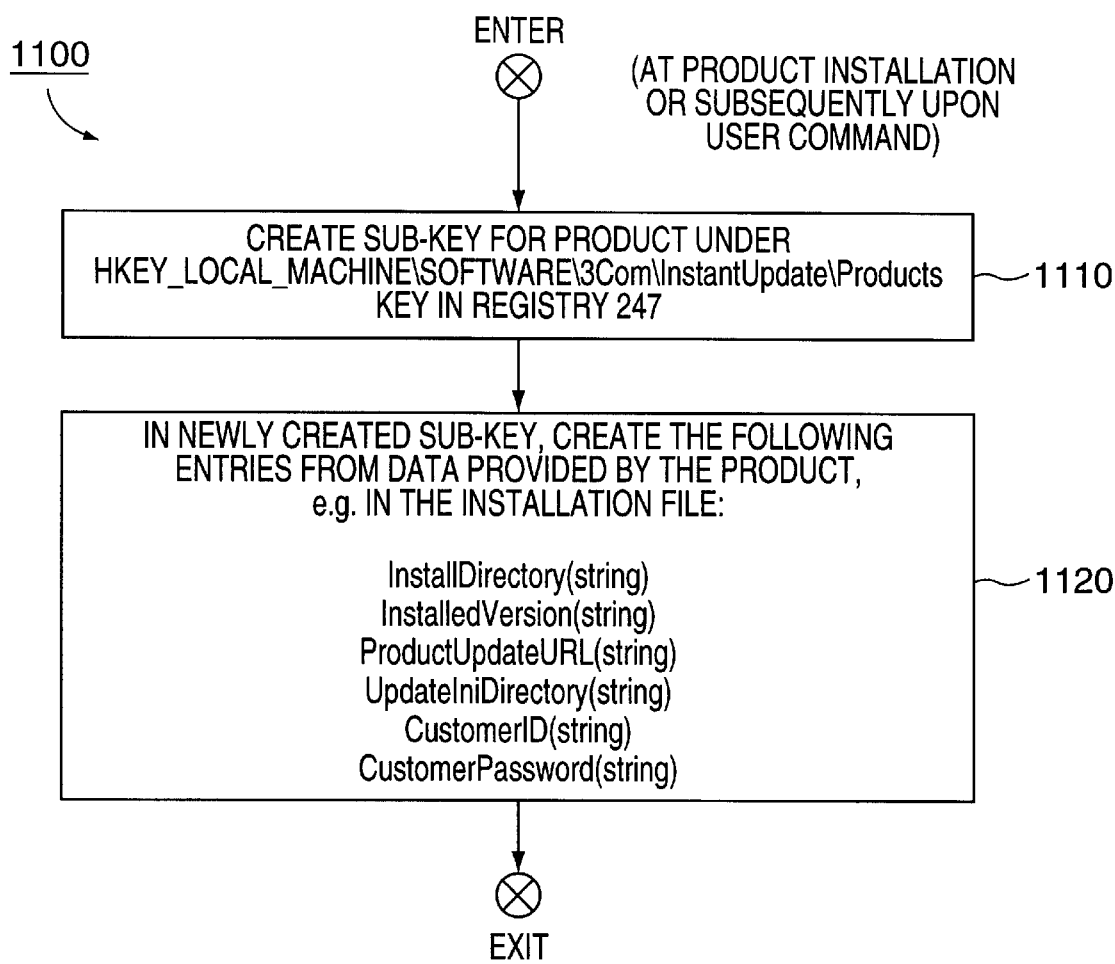
FIG. 11 depicts a high-level flowchart of Product Registration process 1100 which executes on client PC 10, shown in FIG. 1, for registering a product to use our inventive updating technique.
Figure 12A:
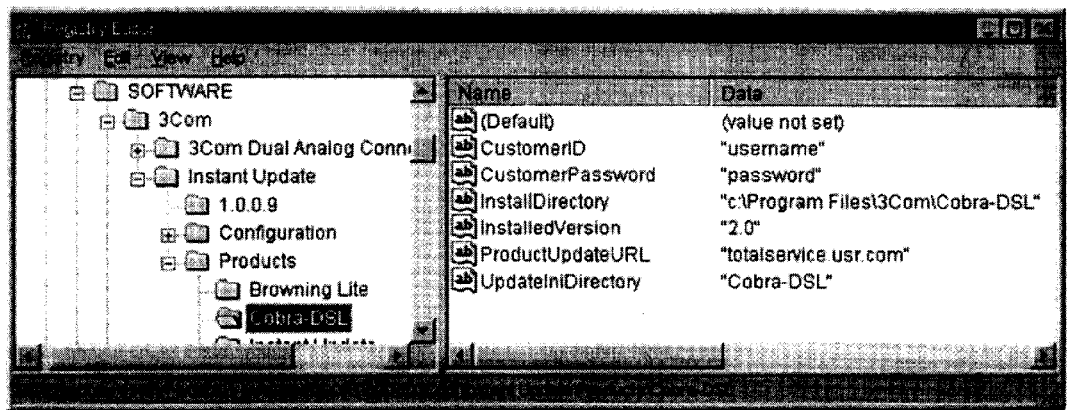
FIGS. 12A and 12B depict illustrative sub-keys holding product registration and configuration information, respectively, created in an operating system registry, for a product that has registered itself to be updated through use of our present invention.

FIG. 11 depicts a high-level flowchart of Product Registration process 1100 which executes on client PC 10, shown in FIG. 1, for registering a product to use our inventive updating technique. FIG. 12A depicts an illustrative product sub-key that is created as a result of product registration. To facilitate understanding, the reader should simultaneously refer to these two figures throughout the following discussion.

As discussed above, product registration occurs either during installation of the product itself or, if the product permits user-initiated product registration, upon subsequent user command. Once registration begins, block 1110 is first performed to create a sub-key for the product under the HKEY_LOCAL_ MACHINE\SOFTWARE\3Com\InstantUpdate\Products key in O/S registry 247. Once this particular sub-key has been created, various entries are created in this sub-key as depicted in block 1120, to produce illustrative product sub-key 1210. All product sub-keys, as shown in sub-key 1210, contain the following entries: a name of a directory (parameter InstallDirectory) on the client PC into which the product should have been installed; a version number (parameter InstalledVersion) of the product once it is updated; a URL (parameter ProductUpdateURL) of an FTP update site for the product; a name of a directory (parameter UpdateIniDirectory) at the FTP site in which the update scripts for the product reside; and a name and password (parameters CustomerID and CustomerPassword, respectively) that are to be used by the client PC in establishing an FTP connection to the update site.

Figure 12B:
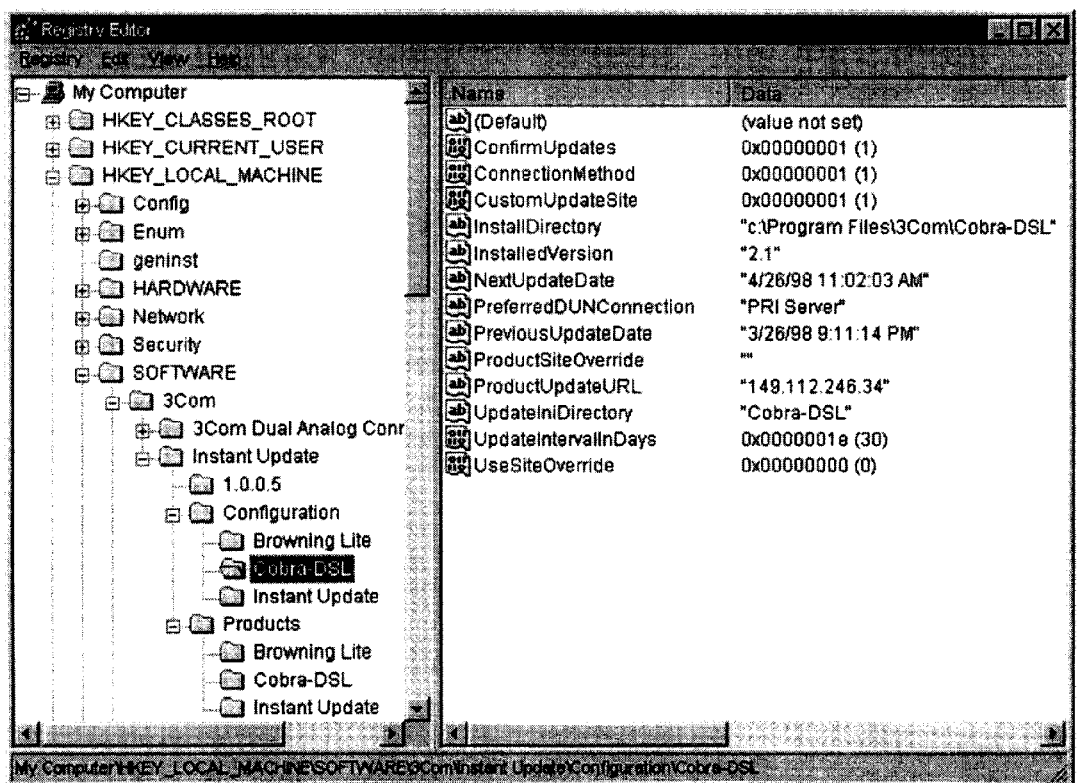

FIG. 12B depicts illustrative configuration sub-key 1250, stored in the O/S registry, for a registered product. The configuration sub-key, here for an illustrative product named "Cobra-DSL", is created during product detection, as discussed above in conjunction with FIG. 6.

FIG. 13 depicts a high-level flowchart of Product De-registration process 1300, which is performed by client PC 10, to completely uninstall a product, including its update information, from the client PC. In essence, process 1300 first de-installs the product itself and then deletes the entries, made during registration and subsequent product detection, in the O/S registry for the product.

Specifically, to begin de-registration, a user first launches, as indicated in block 1310, suitable "uninstall" software for a product which the user has elected to de-register. This software is conventional and is usually installed along with the product itself. The "uninstall" software will first eliminate all product files from local storage on the client PC as well as any registry entries, unrelated to product updating, which have been written to the O/S registry during product installation. Next, as indicated in block 1320, the "uninstall" software will delete its own product sub-key, which was created, as discussed above, during prior product installation in the HKEY_LOCAL_ MACHINE\SOFTWARE\3Com\InstantUpdate\Products key in O/S registry 247. Thereafter, as indicated in block 1330, the instant update client application 15 is either manually launched by the user or is automatically launched the next time the user logs onto the client, by e.g., execution of a start-up group (in the Windows 95 or NT O/S) containing an entry for application 15. Once this application is launched, configuration application 25 automatically removes, i.e., "cleans-up", all configuration entries and other settings in registry 247 under the key H_KEY_LOCAL_ MACHINE\SOFTWARE\3Com\InstantUpdate\Configuration for all products that no longer have a corresponding sub-key in the registry products key. Alternatively, this same "clean-up" operation will occur whenever the user clicks on the "DETECT" button on configuration screen display 1410 (shown in FIG. 14A). Once this "clean-up" completely occurs through, e.g., block 1340, process 1300 is finished with the product being completely de-installed and de-registered. All related product information, including product and configuration data, are also automatically removed from products configuration data 610 (see FIGS. 6–9) through the operations in block 1340.

FIGS. 14A–14D collectively depict four different screen displays, as noted above and produced by configuration application 25 on display 283 (see FIGS. 1 and 2), through which a user can properly configure the operation of software updating application 500.

These screen displays consist of common screen display 1410, scheduling screen display 1430, connection screen display 1450 and general screen display 1470. The user can toggle among these screen displays by clicking on an appropriate one of four tabs 1405 (existing in each screen display but specifically referenced in only screen display 1410), each labeled with a name of a corresponding screen display.

Screen display 1410 lists various installed products that have then registered themselves for use with updating application 500 and permits the user to select by, e.g., clicking on any one such product to set desired update configuration settings for the product through the remaining three screen displays. Illustratively, four such products are shown named as "Browning Lite", "Cobra DSL", "Instant Update" and Viper-DSL" with "Browning Lite" having been selected. Screen display 1410 also presents the user with the "DETECT" button, as described above, through which the user can initiate detection of all newly registered products. This screen display also permits the user to configure updating application 500 to log all events or not and to insert updating application 500 within a "Windows" start-up group such that this application will be automatically executed upon start-up of the Windows O/S at the client PC.

By selecting the "scheduling" tab which causes screen 1430 to be displayed, the user can schedule an automatic update for any product just selected through common screen display 1410 or initiate a update to start by depressing an "Update Now" button. Through "connection" screen display 1450, the user can indicate whether a connection to an update site is to be made through a LAN, specifically a TCP/IP connection, or through a dial-up connection, with for the latter the user specifying a phone book entry (containing a telephone number to dial for a remote network access port) and a name to be used for that connection. Lastly, through "general" screen display 1470, the user can indicate, for a selected product, whether (s)he is to confirm all updates (or not), specify a user name and password, where provided by the update site owner, for the update site for that product and, where appropriate, an update site address for that product (the user name, password and product site would override the defaults stored in the registry) so as to install, on a one-time basis, e.g., a "beta" release of that product from a different site than a default update site. Generally, a user name, password and product site address are not entered in screen display 1470 such that updating application 500 will utilize the defaults, stored in the registry, for the selected product. However, the update site address would revert back to a registered (default) address whenever the user de-selects product site and user name boxes shown in screen display 1470.

Though we discussed our invention in the context of updating firmware stored in a telecommunications device (specifically a terminal adapter) used with a client PC, by now any one skilled in the art will clearly realize that our present invention can be used to update software for any device used with a client PC, regardless of the purpose of that device, provided the software appropriately registers itself with the client PC for updating through our inventive technique either while that software is being installed or, upon user command, thereafter.

In addition, though we have discussed our invention in the context of using the same site for custom web and script-based (FTP) updates of a product, these sites can be different. To accommodate this, appropriate data can be added to the update script to specify a different custom web update site, rather than a default URL stored in the registry during product registration. In this instance, the update script Ini processor would transfer the web site URL in the script to the browser in lieu of the default FTP site specified in the registry. Hence, the manufacturer or network administrator (whichever entity owns the update script) can easily change the custom web update site, as needed, without effecting changes in any client registry.

Moreover, our present invention is not limited to updating software that resides on a client PC itself. In that regard, the invention can be used to update software residing anywhere in a network provided a client PC, which is executing the updating application (specifically application 500), can access the software that is to be updated. Hence, the present invention is applicable to updating not only software associated with devices connected to the client PC but also software associated with network-connected devices to which the client has access.

Though we have described our invention for updating executable software, such as drivers, firmware, application programs, device configurations and O/S components, our invention can also be used to download and disseminate non-executable files, which are not necessarily update files, from an update site to client PCs. Such non-executable files can contain user information pertinent to an installed product, such as, e.g., new product information, help information, and/or user notifications from a product manufacturer. In that regard, a non-executable information file can be automatically downloaded with an instruction in the script to then ask the user whether (s)he wants to then view the file. If so, an instruction in the script can launch a local word processor or text editor on that file to properly display the information contained in the file to the user. Such a non-executable file can also be a stored profile, which provides configuration and/or other operational settings, for use with a particular product installed in networked client PCs. In this manner, a network administrator of, e.g., an enterprise-wide network, can store a common profile for a product—whether it is hardware or software (and whether it is updateable or not), and, through use of our present invention, propagate that profile and install it on each networked client PC that contains that product, hence automatically permitting the product to be uniformly configured on each such client. This, in turn, facilitates network-wide consistency and yields reduced network-wide support costs.

Furthermore, though we have described our invention in conjunction primarily with the Windows operating systems, the teachings of the invention are applicable for use with nearly any other embedded hardware device capable of network communication or client operating system, such as, e.g., UNIX or Solaris operating systems ("UNIX" and "Solaris" being registered trademarks of UNIX Systems Laboratories and Sun Microsystems, Inc., respectively), that can support a network connection between the client and a server and undertake file transfer operations therebetween.

Although a single embodiment, along with various modifications and extensions thereof, which incorporates the teachings of our present invention has been shown and described in detail herein, those skilled in the art can readily devise many other embodiments and variants thereof that still utilize these teachings.

We claim:

1. A method for updating software in a client-server environment through a network server, comprising the steps of, in a client computer:
   (A) determining a country or a locale within which the client computer is situated and, in response thereto, constructing a file name for a file containing an update script for use in the country or the locale;
   (B) issuing a request to the network server to download the file containing the update script to the client computer; and
   (C) processing the script on the client computer so as to complete an update of the software, wherein the processing step comprises the steps of:
      (C1) determining an operating system (O/S) then executing on the client computer; and
      (C2) wherein the update script comprises at least one of O/S-specific and O/S-independent sections:
         (C2a) if the O/S-independent section specifies a first update file name, extracting a first group of update file names from the O/S-independent section, the first group having at least one associated update file name; and
         (C2b) if the O/S-specific section of the script corresponds to the O/S executing on the client computer and specifies a second update file name, extracting a second group of update file names from the O/S-independent section, the second group having at least one associated update file name; and
      (C3) requesting a download to the client computer of update files from the network server corresponding to the first and second groups of update file names, to the extent at least one of the first and second groups of file names are specified in the O/S-independent and O/S-specific sections.

2. The method in claim 1 wherein the software is installed on the client computer, on a device connected to the client computer wherein the client computer has access to the software, or on any device to which the client computer can establish a network connection and wherein the client computer has access to the software.

3. The method in claim 2 further comprising the step of issuing, in the event no country or locale specific update file can be found on the server, a request to the server to download a predefined update file, to the client computer, containing a default update script.

4. The method in claim 1 where the first and second groups of update file names comprise first and second groups of names of "copy" files, respectively, and first and second groups of names of "run" files, respectively, wherein the processing step further comprises the steps of:

copying each of the update files in the first and second groups of "copy" files from the network server into local storage on the client computer so as to form transferred "copy" files;

copying each of the update files in the first and second groups of "run" files from the network server into the local storage so as to form transferred "run" files; and executing, from local storage, each of the transferred "run" files, in the order each of said "run" files was transferred from the network server to the client computer, so as to install the update, the update being collectively implemented by the transferred "copy" files and the transferred "run" files.

5. The method in claim 4 further comprising the step of storing each of the transferred "copy" files and each of the transferred "run" files into an associated destination directory, in the local storage, as specified in the update script.

6. The method in claim 5 wherein the software is an application program, firmware, device driver, device configuration, operating system or any component thereof.

7. The method on claim 5 wherein the update comprises a non-executable file to be transferred to the client computer, wherein the non-executable file comprises information, help or profile data.

8. The method in claim 7 further comprising the step of displaying the non-executable file, once transferred, to a user at the client computer.

9. A computer readable medium having computer executable instructions stored therein for performing the steps of claim 1.

10. A method for updating software in a client-server environment through a network server, comprising the steps of:

in a client computer:

(A) determining a country or a locale within which the client computer is situated and, in response thereto, constructing a file name for a file containing an update script for use in the country or the locale;

(B) issuing a request to the network server to download the file containing the update script to the client computer; and (C) processing the script on the client computer so as to complete an update of the software, wherein the processing step comprises the steps of:

(C1) determining an operating system (O/S) then executing on the client computer; and (C2) wherein the update script comprises at least one of O/S-specific and O/S-independent sections:

(C2a) if the O/S-independent section specifies a first update file name, extracting a first group of update file names from the O/S-independent section, the first group having at least one associated update file name; and (C2b) if the O/S-specific section of the script corresponds to the O/S executing on the client computer and specifies a second update file name, extracting a second group of update file names from the O/S-independent section, the second group having at least one associated update file name; and (C3) requesting a download to the client computer of update files from the network server corresponding to the first and second groups of update file names, to the extent at least one of the first and second groups of file names are specified in the O/S-independent and O/S-specific sections; and in the network server:

(D) downloading, in response to the request, the file containing the update script to the client computer.

11. The method in claim 1 wherein the software is installed on the client computer, on a device connected to the client computer wherein the client computer has access to the software, or on any device to which the client computer can establish a network connection and wherein the client computer has access to the software.

12. The method in claim 11 further comprising the step of:

in the client computer, issuing, in the event no country or locale specific update file can be found on the server, a request to the server to download a predefined update file, to the client computer, containing a default update script; and in the network server, downloading, in response to the predefined update file download request, the predefined update file to the client computer.

13. The method in claim 1 where the first and second groups of update file names comprise first and second groups of names of "copy" files, respectively, and first and second groups of names of "run" files, respectively, wherein the processing step further comprises the steps of, in the client computer:

copying each of the update files in the first and second groups of "copy" files from the network server into local storage on the client computer so as to form transferred "copy" files;

copying each of the update files in the first and second groups of "run" files from the network server into the local storage so as to form transferred "run" files; and executing, from local storage, each of the transferred "run" files, in the order each of said "run" files was transferred from the network server to the client computer, so as to install the update, the update being collectively implemented by the transferred "copy" files and the transferred "run" files.

14. The method in claim 13 further comprising the step of, in the client computer, storing each of the transferred "copy" files and each of the transferred "run" files into an associated destination directory, in the local storage, as specified in the update script.

15. The method in claim 14 wherein the software is an application program, firmware, device driver, device configuration, operating system or any component thereof.

16. The method on claim 14 wherein the update comprises a non-executable file to be transferred to the client computer, wherein the non-executable file comprises information, help or profile data.

17. The method in claim 16 further comprising the step of, in the client computer, displaying the non-executable file, once transferred, to a user at the client computer.

18. Apparatus for updating software in a client-server environment through a network server, comprising:

a client computer having
  a processor; and
  a memory, connected to the processor, having computer executable instructions stored therein; and
wherein, in response to the stored instructions, the processor:
  (A) determines a country or a locale within which the client computer is situated and, in response thereto, constructing a file name for a file containing an update script for use in the country or the locale;
  (B) issues a request to the network server to download the file containing the update script to the client computer; and
  (C) processes the script on the client computer so as to complete an update of the software through which the processor:
    (C1) determines an operating system (O/S) then executing on the client computer; and
    (C2) wherein the update script comprises at least one of O/S-specific and O/S-independent sections:
      (C2a) if the O/S-independent section specifies a first update file name, extracts a first group of update file names from the O/S-independent section, the first group having at least one associated update file name; and
      (C2b) if the O/S-specific section of the script corresponds to the O/S executing on the client computer and specifies a second update file name, extracts a second group of update file names from the O/S-independent section, the second group having at least one associated update file name; and
    (C3) requests a download to the client computer of update files from the network server corresponding to the first and second groups of update file names, to the extent at least one of the first and second groups of file names are specified in the O/S-independent and O/S-specific sections.

19. The apparatus in claim 18 wherein the software is installed on the client computer, on a device connected to the client computer wherein the client computer has access to the software, or on any device to which the client computer can establish a network connection and wherein the client computer has access to the software.

20. The apparatus in claim 19 wherein the processor, in response to the stored instructions, issues, in the event no country or locale specific update file can be found on the server, a request to the server to download a predefined update file, to the client computer, containing a default update script.

21. The apparatus in claim 18 where the first and second groups of update file names comprise first and second groups of names of "copy" files, respectively, and first and second groups of names of "run" files, respectively, wherein the processor, in response to the stored instructions:
  copies each of the update files in the first and second groups of "copy" files from the network server into local storage on the client computer so as to form transferred "copy" files;
  copies each of the update files in the first and second groups of "run" files from the network server into the local storage so as to form transferred "run" files; and
  executes, from local storage, each of the transferred "run" files, in the order each of said "run" files was transferred from the network server to the client computer, so as to install the update, the update being collectively implemented by the transferred "copy" files and the transferred "run" files.

22. The apparatus in claim 21 further wherein the processor, in response to the stored instructions, stores each of the transferred "copy" files and each of the transferred "run" files into an associated destination directory, in the local storage, as specified in the update script.

23. The apparatus in claim 22 wherein the software is an application program, firmware, device driver, device configuration, operating system or any component thereof.

24. The apparatus on claim 22 wherein the update comprises a non-executable file to be transferred to the client computer, wherein the non-executable file comprises information, help or profile data.

25. The apparatus in claim 24 wherein the processor, in response to the stored instructions, displays the non-executable file, once transferred, to a user at the client computer.

26. Apparatus for updating software in a client-server environment through a network server, comprising:
  a client computer having a processor; and
  a memory, connected to the processor, having computer executable instructions stored therein; and
  wherein, in response to the stored instructions, the processor:
    (A) determines a country or a locale within which the client computer is situated and, in response thereto, constructing a file name for a file containing an update script for use in the country or the locale;
    (B) issues a request to the network server to download the file containing the update script to the client computer; and
    (C) processes the script on the client computer so as to complete an update of the software through which the processor:
      (C1) determines an operating system (O/S) then executing on the client computer; and
      (C2) wherein the update script comprises at least one of O/S-specific and O/S-independent sections:
        (C2a) if the O/S-independent section specifies a first update file name, extracts a first group of update file names from the O/S-independent section, the first group having at least one associated update file name; and
        (C2b) if the O/S-specific section of the script corresponds to the O/S executing on the client computer and specifies a second update file name, extracts a second group of update file names from the O/S-independent section, the second group having at least one associated update file name; and
      (C3) requests a download to the client computer of update files from the network server corresponding to the first and second groups of update file names, to the extent at least one of the first and second groups of file names are specified in the O/S-independent and O/S-specific sections; and
  the network server which:
    (D) downloads, in response to the request, the file containing the update script to the client computer.

27. The apparatus in claim 26 wherein the software is installed on the client computer, on a device connected to the client computer wherein the client computer has access to the software, or on any device to which the client computer can establish a network connection and wherein the client computer has access to the software.

28. The apparatus in claim 27 wherein
  the processor, in response to the stored instructions issues, in the event no country or locale specific update file can be found on the server, a request to the server to download a predefined update file, to the client computer, containing a default update script; and the network server downloads, in response to the predefined update file download request, the predefined update file to the client computer.

29. The apparatus in claim 26 where the first and second groups of update file names comprise first and second groups of names of "copy" files, respectively, and first and second groups of names of "run" files, respectively, wherein the processor, in response to the stored instructions:

copies each of the update files in the first and second groups of "copy" files from the network server into local storage on the client computer so as to form transferred "copy" files;

copies each of the update files in the first and second groups of "run" files from the network server into the local storage so as to form transferred "run" files; and executes, from local storage, each of the transferred "run" files, in the order each of said "run" files was transferred from the network server to the client computer, so as to install the update, the update being collectively implemented by the transferred "copy" files and the transferred "run" files.

30. The apparatus in claim 29 wherein the processor in response to the stored instructions, stores each of the transferred "copy" files and each of the transferred "run" files into an associated destination directory, in the local storage, as specified in the update script.

31. The apparatus in claim 30 wherein the software is an application program, firmware, device driver, device configuration, operating system or any component thereof.

32. The apparatus on claim 30 wherein the update comprises a non-executable file to be transferred to the client computer, wherein the non-executable file comprises information, help or profile data.

33. The apparatus in claim 32 wherein the processor, in response to the stored instructions, displays the non-executable file, once transferred, to a user at the client computer.

* * * * *